US009461802B2

(12) United States Patent
Park

(10) Patent No.: US 9,461,802 B2
(45) Date of Patent: Oct. 4, 2016

(54) APPARATUS AND METHOD FOR TRANSMITTING HARQ ACK/NACK

(71) Applicant: Innovative Technology Lab Co., Ltd., Seoul (KR)

(72) Inventor: Dong Hyun Park, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 130 days.

(21) Appl. No.: 14/552,402

(22) Filed: Nov. 24, 2014

(65) Prior Publication Data

US 2015/0146588 A1    May 28, 2015

(30) Foreign Application Priority Data

Nov. 25, 2013    (KR) ......................... 10-2013-0144161

(51) Int. Cl.
*H04L 12/26* (2006.01)
*H04L 5/00* (2006.01)
*H04L 5/14* (2006.01)
*H04L 1/18* (2006.01)

(52) U.S. Cl.
CPC ............... *H04L 5/0055* (2013.01); *H04L 1/18* (2013.01); *H04L 5/001* (2013.01); *H04L 5/0098* (2013.01); *H04L 5/14* (2013.01)

(58) Field of Classification Search
CPC ... H04W 16/02; H04W 16/04; H04W 16/06; H04W 16/10; H04B 7/2123
See application file for complete search history.

(56) References Cited

U.S. PATENT DOCUMENTS

| 8,885,526 | B2* | 11/2014 | He et al. ....................... 370/280 |
| 2011/0280164 | A1 | 11/2011 | Luo et al. | |
| 2012/0034927 | A1 | 2/2012 | Papasakellariou et al. | |
| 2012/0257552 | A1 | 10/2012 | Chen et al. | |
| 2013/0294242 | A1* | 11/2013 | Zhao et al. .................... 370/235 |
| 2013/0301586 | A1* | 11/2013 | Fan et al. ....................... 370/329 |
| 2014/0003303 | A1* | 1/2014 | Yang et al. .................... 370/280 |
| 2014/0195066 | A1* | 7/2014 | Nanda et al. ................. 370/329 |
| 2015/0023229 | A1* | 1/2015 | Yin et al. ....................... 370/280 |

FOREIGN PATENT DOCUMENTS

WO    WO 2012/124980 A2    9/2012
WO    WO 2013/043025 A2    3/2013

OTHER PUBLICATIONS

"3rd Generation Partnership Project; Technical Specification Group Radio Access Network; Evolved Universal Terrestrial Radio Access (E-UTRA); Multiplexing and channel coding (Release 11)"; 3GPP TS 36.212 V11.3.0, Jun. 2013, pp. 1-84, 3GPP Organizational Partners.

(Continued)

*Primary Examiner* — Alvin Zhu

(57) ABSTRACT

Provided is a method and apparatus for transmitting an HARQ ACK/NACK. The method includes: in a TDD-FDD CA scheme; recognizing a 2-bit downlink (DL) downlink assignment index (DAI) field configured in a DL downlink control information (DCI) format, the DL DCI format indicating a Physical Downlink Shared Channel (PDSCH) transmission on the second serving cell, and the 2-bit DL DAI field indicating that ten downlink subframes for the second serving cell are associated with one uplink subframe; in response to received data, generating a Hybrid Automatic Repeat reQuest (HARQ) Acknowledgement/Negative Acknowledgement (ACK/NACK) signal, the HARQ ACK/NACK signal being indexed based on a value of the 2-bit DL DAI field; and transmitting the HARQ ACK/NACK signal through one uplink subframe of the first serving cell.

14 Claims, 20 Drawing Sheets

(56) References Cited

OTHER PUBLICATIONS

3rd Generation Partnership Project; Technical Specification Group Radio Access Network; Evolved Universal Terrestrial Radio Access (E-UTRA); Physical layer procedures (Release 11); 3GPP TS 36.213 V11.4.0, Sep. 2013, pp. 1-182, 3GPP Organizational Partners.

International Search Report for International Patent Application No. PCT/KR2014/011292, dated Feb. 24, 2015.

Written Opinion for International Patent Application No. PCT/KR2014/011292, dated Feb. 24, 2015.

* cited by examiner (a) CA of TDD & FDD (b) CA of TDD & FDD DL (c) CA of TDD DL & FDD

FIG. 8

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Pcell (FDD) | D | S | U | U | D | D | S | U | U | D | D | S | U | U | D | D | S | U | U | D |
| | ⊠ | ⊠ | | D | D | ⊠ | ⊠ | ⊠ | D | D | ⊠ | ⊠ | | D | D | ⊠ | ⊠ | ⊠ | D | D |
| | U | U | U | U | U | U | U | U | U | U | U | U | U | U | U | U | U | U | U | U |

| | 0 | 1 | 2 | 3 | 4 | 5 | 6 | 7 | 8 | 9 | 0 | 1 | 2 | 3 | 4 | 5 | 6 | 7 | 8 | 9 | |
|---|---|---|---|---|---|---|---|---|---|---|---|---|---|---|---|---|---|---|---|---|---|
| Pcell (TDD#2) | D | S | U | | D | D | S | U | D | D | D | S | U | D | D | D | S | U | D | D | |
| | | | 8,7,6,4 | | | | | 8,7,6,4 | | | | | 8,7,6,4 | | | | | 8,7,6,4 | | | |
| Scell (FDD) | D | D | D | D | D | D | D | D | D | D | D | D | D | D | D | D | D | D | D | D | |
| | U | U | U | U | U | U | U | U | U | U | U | U | U | U | U | U | U | U | U | U | |
| new DL timing #2 | | | | | n-8 | n-7 | n-6 | n-5 | n-4 | | | | | | n-8 | n-7 | n-6 | n-5 | n-4 | | |

FIG. 11

APPARATUS AND METHOD FOR TRANSMITTING HARQ ACK/NACK

CROSS-REFERENCE TO RELATED APPLICATION

This application claims priority from and the benefit of Korean Patent Application No. 10-2013-0144161, filed on Nov. 25, 2013, which is hereby incorporated by reference in its entirety.

BACKGROUND

1. Field

The present disclosure relates to wireless communication, and more particularly, to a method and apparatus for transmitting an HARQ ACK/NACK.

2. Discussion of the Background

Automatic repeat request (ARQ) is one of the schemes that enhance reliability of a wireless communication. The ARQ refers to a scheme in which a transmitter retransmits a data signal if a data signal reception is failed at a receiver. Further, there is a scheme, hybrid automatic repeat request (HARQ), which is a combination of Forward Error Correction (FEC) and ARQ. A receiver that utilizes HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC). According to the adoption of the carrier aggregation system, ACK/NACK signals corresponding to a plurality of component carriers (CCs) need to be transmitted.

Recently, a Time Division Duplex (TDD)-Frequency Division Duplex (FDD) Carrier Aggregation (CA) that supports a CA and/or dual connectivity of a FDD band (or carrier) and a TDD band (or carrier) has been considered. The TDD-FDD CA is referred to as a TDD-FDD joint operation. However, when it is assumed that a plurality of serving cells that are aggregated by the CA exist, and a first serving cell is configured as TDD and a second serving cell is configured as FDD, there may be difficulty in transmitting a HARQ ACK/NACK for downlink (DL) transmission on all subframes of the second serving cell according to the TDD-FDD CA. For example, in a circumstance that allows only a control channel of the first serving cell (that is, a Physical Uplink Control Channel (PUCCH)) for transmitting a HARQ ACK/NACK of the second serving cell, a large number of DL subframes of the second serving cell may exist in association with a single UL subframe of the first serving cell. Therefore, there is desire for a method of effectively transmitting a HARQ ACK/NACK, for the TDD-FDD CA.

SUMMARY

Exemplary embodiments of the present invention provide a method and apparatus for transmitting a HARQ ACK/NACK, and a method and apparatus for receiving a HARQ ACK/NACK.

Exemplary embodiments of the present invention provide a method and apparatus for bundling a HARQ ACK/NACK associated with a new associated subframe with a HARQ ACK/NACK associated with a legacy associated subframe.

An exemplary embodiment of the present invention provides a method of communicating control information between a base station and a user equipment (UE), the method including: establishing a Radio Resource Control (RRC) connection with the base station through a first serving cell, the first serving cell supporting a Time Division Duplex (TDD) mode; receiving an RRC message from the base station through the first serving cell, the RRC message including carrier aggregation (CA) configuration information, the CA configuration information including information of a second serving cell supporting a Frequency Division Duplex (FDD) mode, and the first serving cell and the second serving cell being aggregated by a TDD-FDD CA scheme; recognizing a 2-bit downlink (DL) downlink assignment index (DAI) field configured in a DL downlink control information (DCI) format, the DL DCI format indicating a Physical Downlink Shared Channel (PDSCH) transmission on the second serving cell, and the 2-bit DL DAI field indicating that ten downlink subframes for the second serving cell are associated with one uplink subframe; receiving, at the UE, at least one of a Physical Downlink Control Channel (PDCCH) and an Enhanced PDCCH (EPDCCH), the at least one of the PDCCH and the EPDCCH including the DL DCI format; receiving, at the UE, data through the first serving cell and the second serving cell; in response to the received data, generating a Hybrid Automatic Repeat reQuest (HARQ) Acknowledgement/Negative Acknowledgement (ACK/NACK) signal, the HARQ ACK/NACK signal being indexed based on a value of the 2-bit DL DAI field; and transmitting the HARQ ACK/NACK signal through one uplink subframe of the first serving cell.

An exemplary embodiment of the present invention provides a method of communicating control information between a base station and a user equipment (UE), the method including: establishing a Radio Resource Control (RRC) connection with the UE through a first serving cell, the first serving cell supporting a Time Division Duplex (TDD) mode; transmitting an RRC message to the UE through the first serving cell, the RRC message including carrier aggregation (CA) configuration information, the CA configuration information including information of a second serving cell supporting a Frequency Division Duplex (FDD) mode, and the first serving cell and the second serving cell being aggregated by a TDD-FDD CA scheme; configuring a 2-bit downlink (DL) downlink assignment index (DAI) field in a DL downlink control information (DCI) format, the DL DCI format indicating a Physical Downlink Shared Channel (PDSCH) transmission on the second serving cell, and the 2-bit DL DAI field indicating that ten downlink subframes for the second serving cell are associated with one uplink subframe; transmitting, to the UE, at least one of a Physical Downlink Control Channel (PDCCH) and an Enhanced PDCCH (EPDCCH), the at least one of the PDCCH and the EPDCCH including the DL DCI format; transmitting, to the UE, data through the first serving cell and the second serving cell; and in response to the transmitted data, receiving a Hybrid Automatic Repeat reQuest (HARQ) Acknowledgement/Negative Acknowledgement (ACK/NACK) signal, the HARQ ACK/NACK signal being indexed based on a value of the 2-bit DL DAI field. The HARQ ACK/NACK signal is received through one uplink subframe of the first serving cell.

Under a circumstance of CA of a TDD-based cell (or carrier) and an FDD-based cell (or carrier), a base station and a terminal may implement an effective HARQ ACK/NACK transmitting method.

BRIEF DESCRIPTION OF THE DRAWINGS

FIG. 8 illustrates an example of a DL HARQ timing when a terminal for which a TDD-FDD CA is configured operates based on self-scheduling.

FIG. 9 illustrates an example of a DL HARQ timing when a terminal for which a TDD-FDD CA is configured operates based on cross-carrier scheduling.

FIGS. 10 and 11 are diagrams illustrating a new DL HARQ timing according to an exemplary embodiment of the present invention.

DETAILED DESCRIPTION OF THE ILLUSTRATED EMBODIMENTS

Figure 1:
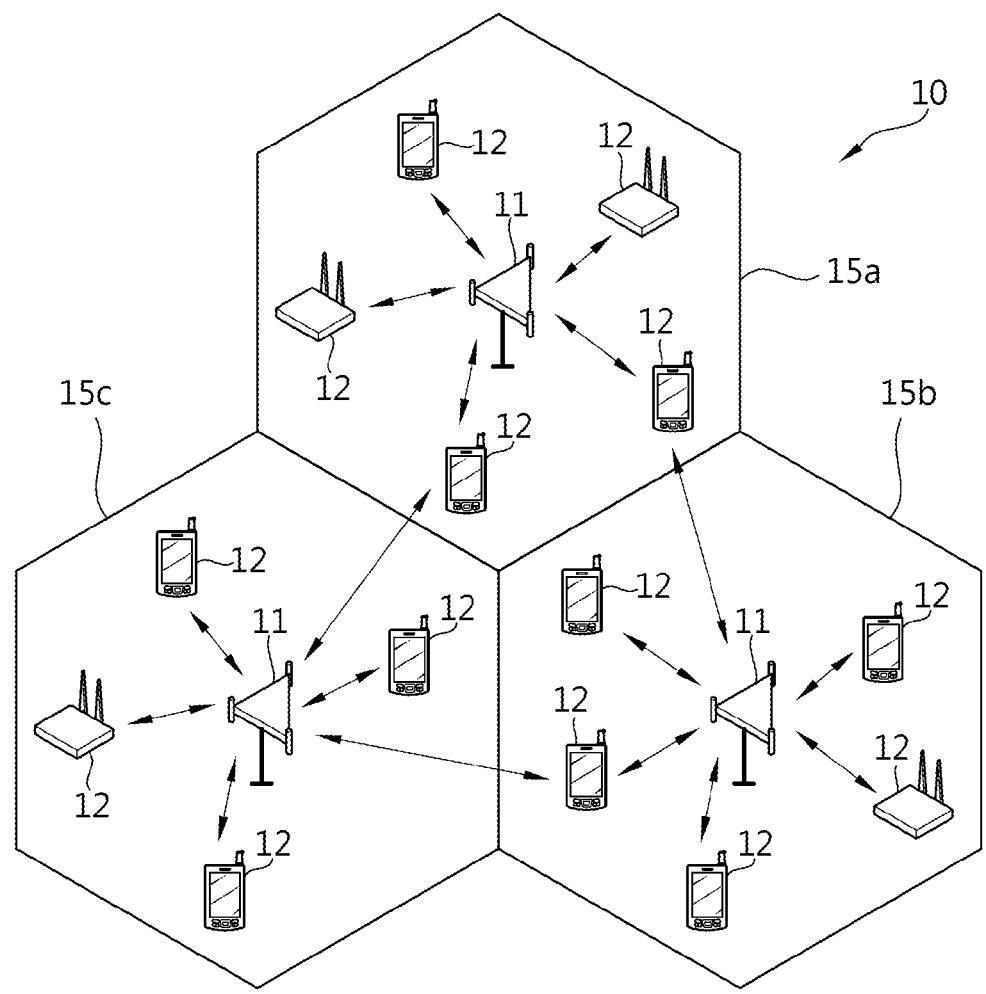
FIG. 1 illustrates a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

Further, the description herein is related to a wireless communication network, and an operation performed in a wireless communication network may be performed in a process of controlling a network and transmitting data by a system that controls a wireless network (e.g., a base station) or may be performed in a user equipment connected to the wireless communication network.

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA may be divided as contiguous carrier aggregation, which is made among continuous CCs, and non-contiguous carrier aggregation, which is made among non-continuous CCs. The number of carriers aggregated between uplink and downlink may be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) may be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) may be aggregated together.

Hereinafter, a multiple carrier system includes the system that supports carrier aggregation. Contiguous CA and/or non-contiguous CA may be used in the multiple carrier system; in addition, both symmetric aggregation and asymmetric aggregation may be used in the multiple carrier system as well. A serving cell may be defined as a component frequency band based on multiple CC system which may be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell may be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to an SCell refers to a DL Secondary Component Carrier (SCC), and an uplink component carrier corresponding to an SCell refers to a UL SCC. Only DL CC or UL CC may correspond to a serving cell, or a DL CC and an UL CC together may correspond to a serving cell.

Figure 2:
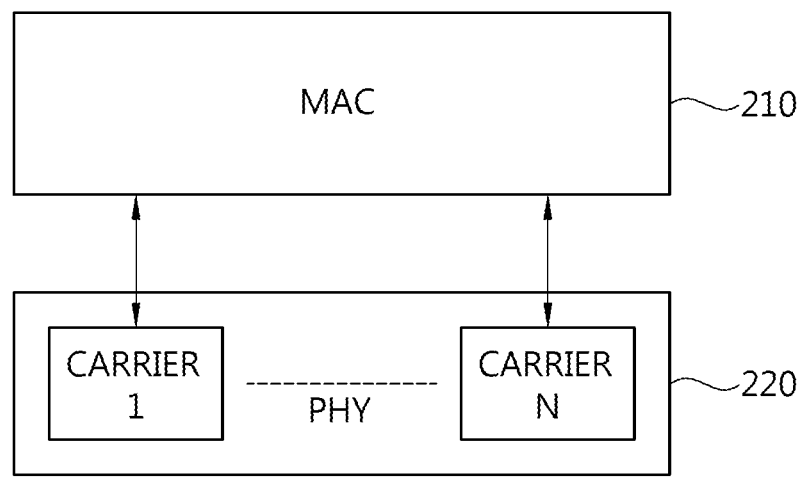
FIG. 2 illustrates an example of a protocol structure for supporting a multi-carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. As a DL physical channel, a Physical Downlink Control Channel (PDCCH) informs to a UE with regard to resource allocation of a Paging Channel (PCH) and a Downlink Shared Channel (DL-SCH), and a Hybrid Automatic Repeat Request (HARQ) information related to a DL-SCH. The PDCCH may carry uplink grant which informs a resource allocation of uplink transmission to a UE. The DL-SCHO is mapping to a Physical Downlink Shared Channel (PDSCH). A Physical Control Format Indicator Channel (PCFICH), which transmits every sub-frame, informs the number of OFDM symbols used on the PDCCHs to a user equipment. A Physical Hybrid ARQ Indicator Cannel (PHICH), as a DL channel, carries the HARQ ACK/NACK signals as a response to uplink transmission. As a UL physical channel, Physical Uplink Control Channel (PUCCH) may carry UL controlling information such as ACK (Acknowledgement)/NACK (Non-acknowledgement) or Channel Status Information (CSI) which includes Channel Quality Indicator (CQI), Precoding Matrix Index (PMI), Precoding Type Indicator (PTI) or Rank Indication (RI). The Physical Uplink Shared Channel (PUSCH) carries the Uplink Shared Channel (UL-SCH). The Physical Random Access Channel (PRACH) carries random access preamble.

A plurality of the PDCCH may be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
|---|---|
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spartial multiplexing mode. |
| 2A | Used for the PDSCH scheduling of the user equipment configured of large delay CDD mode |
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the tramission of TPC commands for PUCCH and PUSCH including 2-bit power adjustment |
| 3A | Used for the tramission of TPC commands for PUCCH and PUSCH including single-bit power adjustment |
| 4 | Used for the PUSCH scheduling in the uplink multi-antenna port transmission cell |

Referring to Table 1, There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spartial multiplexing mode, format 2B used for the PDSCH scheduling in open-loop spartial multiplexing mode, format 2B used in the transmission mode 8, format 2C used in the transmission mode 9, format 2D used in the transmission mode 10, format 3 and 3A used for the uplink transmission of TPC commands for the PUCCH and the PUSCH, and format 4 used for the PUSCH scheduling in the uplink multi-antenna port transmission cell.

Each field of DCI is sequentially mapped to n number of information bits $a_0$ or $a_{n-1}$. For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH may be transmitted through different DL CCs, and the PUSCH may be transmitted through a UL CC other than a UL CC linked to a DL CC on which a PDCCH including a UL grant is transmitted.

During cross-carrier scheduling, a user equipment only receives scheduling information (such as UL grant) through a serving cell (or CC). Hereinafter, a serving cell (or CC) performing cross-carrier scheduling may refer to scheduling cell (or CC), and a serving cell being scheduled by scheduling cell may refer to scheduled cell (or CC). Scheduling cell may refer to ordering cell, and scheduled cell may refer to following serving cell. For example, a scheduled cell may be scheduled by a scheduling cell. Scheduling information for the scheduled cell may be received through the scheduling cell.

As such, in a system supporting the cross-carrier scheduling, a carrier indicator is necessary to report which DL CC/UL CC was used to transmit the PDCCH/EPDCCH which indicates the PDSCH/PUSCH transmission. A field including the carrier indicator is hereinafter called a carrier indication field (CIF). Hereinafter, configuration of CIF may mean that configuration of cross-carrier scheduling.

The aforementioned cross-carrier scheduling may be classified into the DL cross-carrier scheduling and UL cross-carrier scheduling. The DL cross-carrier scheduling implies a case where the CC for transmitting the PDCCH/EPDCCH including resource allocation information for the PDSCH transmission and other information is different from a CC for transmitting the PDSCH. The UL cross-carrier scheduling implies a case where a CC for transmitting the PDCCH/EPDCCH including a UL grant for the PUSCH transmission is different from the DL CC linked to the UL CC for transmitting the PUSCH.

Figure 3:
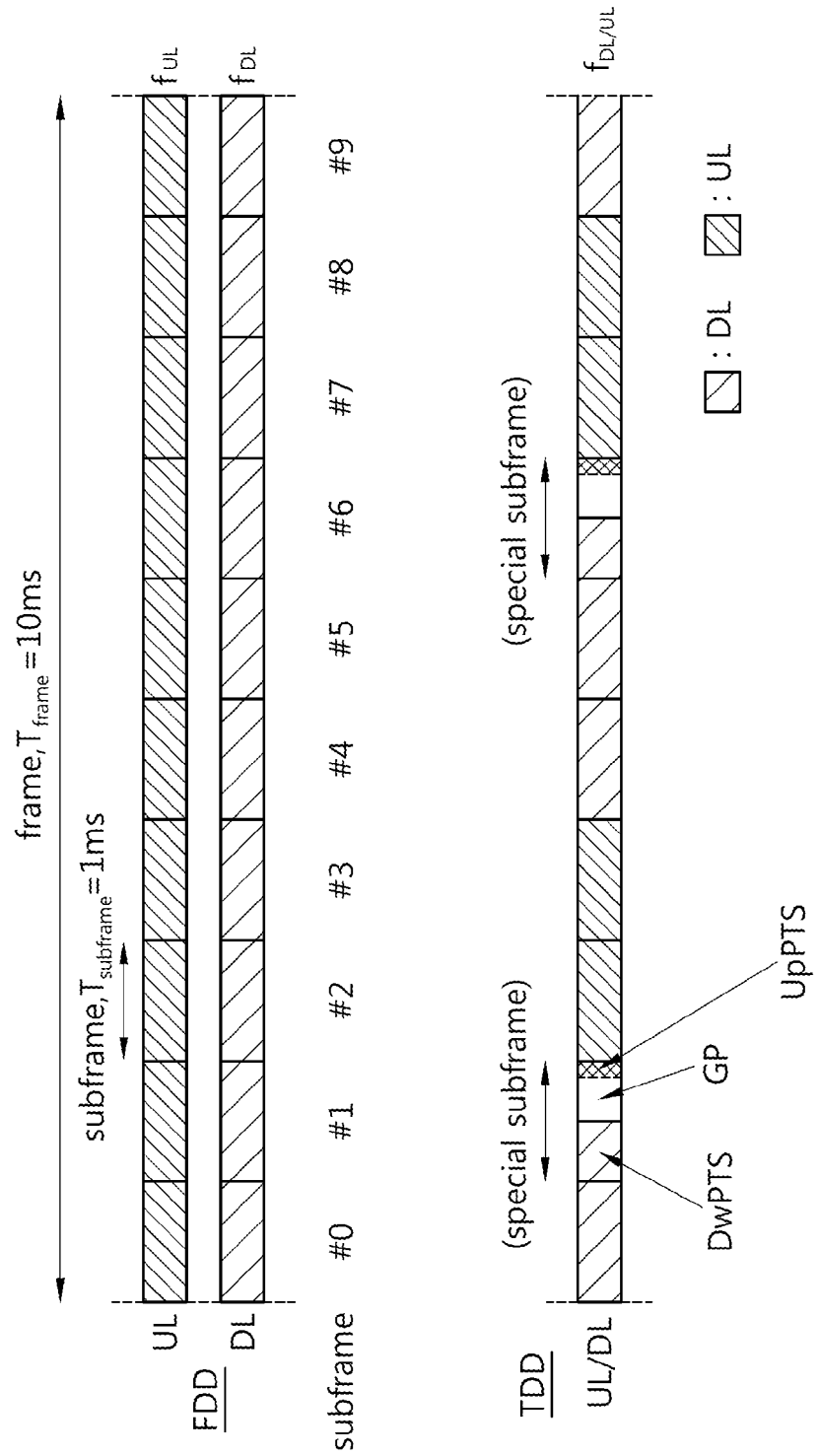
FIG. 3 illustrates an example of a radio frame structure according to an exemplary embodiment of the present invention.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission may be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe may be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL/DL configuration of radio frame. UL/DL configuration defines reserved subframe for UL transmission or reserved subframe for DL transmission. That is, UL/DL configuration informs the rules how the uplink and the downlink are allocated (or reserved) in every subframe of one radio frame.

TABLE 2

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL/DL transmission may be given asymmetrically. To avoid severe interference between UL and DL among cells, neighboring cells generally have same UL-DL configuration.

The point changing from DL to UL or the point changing from UL to DL is referred to as the switching point. The switch-point periodicity, which is either 5 ms or 10 ms, means a repeating period of the same changing aspect between the UL subframe and DL subframe. For example, referring to the UL/DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 2 may be transmitted from a base station to a user equipment through system information. The base station may inform a UL/DL allocation status change in a radio frame to a UE by transmitting the index of the UL/DL configuration whenever the UL/DL configuration changes. Or the UL/DL configuration may be control information which is transmitted to every UE in the cell through broadcast channel.

Hereinafter, HARQ will be described. A base station transmits a DL grant, which is PDSCH scheduling information, to a terminal through a PDCCH or an EPDCCH, and transmits a PDSCH. Then, the terminal transmits a HARQ Acknowledgement/Non-acknowledgement (ACK/NACK) with respect to a DL-SCH Transport Block (TB) received through the PDSCH, trough a PUCCH at a predetermined timing. The base station repeats the process during a predetermined period of time until receiving a HARQ ACK signal from the terminal, which is referred to as HARQ. In other words, from the perspective of the base station, HARQ refers to an operation that receives a HARQ ACK/NACK with respect to a DL transmission from the terminal, and executes a DL retransmission or a new transmission. From the perspective of the terminal, HARQ refers to an operation that transmits a HARQ ACK/NACK with respect to a DL transmission to the base station, and receives a DL retransmission or a new transmission.

For the FDD, when a terminal detects a PDSCH transmission for the corresponding terminal from a subframe n−4, the terminal transmits a HARQ response in a subframe n.

For TDD, when PDSCH transmission indicated by detection of a corresponding PDCCH/EPDCCH exists in a subframe n−k, or when a PDCCH/EPDCCH indicating Semi-Persistent Scheduling (SPS) release exists, the terminal transmits a HARQ response in a subframe n. In this instance, DL HARQ ACK/NACK timings may be listed as shown in Table 3.

TABLE 3

| UL/DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 3, n denotes a subframe number, and a "DL subframe set" associated with a subframe of the corresponding number is determined by $K=\{k_0, k_1, \ldots, K_{M-1}\}$. n−k denotes an index of a subframe that is k subframes before from an $n^{th}$ subframe, and indicates a DL subframe (that is, a DL HARQ timing) associated with a current subframe. The associated DL subframe indicates a subframe that delivers a PDSCH which is the basis of the determination on a HARQ ACK/NACK signal. M denotes the number of elements of a set K defined in table 3, and indicates the number of DL subframes associated with the $n^{th}$ subframe, or a bundling window size.

For example, when UL-DL configuration 1 is applied to a serving cell, M of a DL subframe set K associated with a subframe 2 is 2 (M=2), $k_0$=7, and $k_1$=6. Therefore, DL subframes (or DL HARQ timings) associated with the subframe 2 of the corresponding serving cell are a subframe 5 (2-$k_0$) and a subframe 6 (2-$k_1$) of a previous radio frame.

Figure 4:
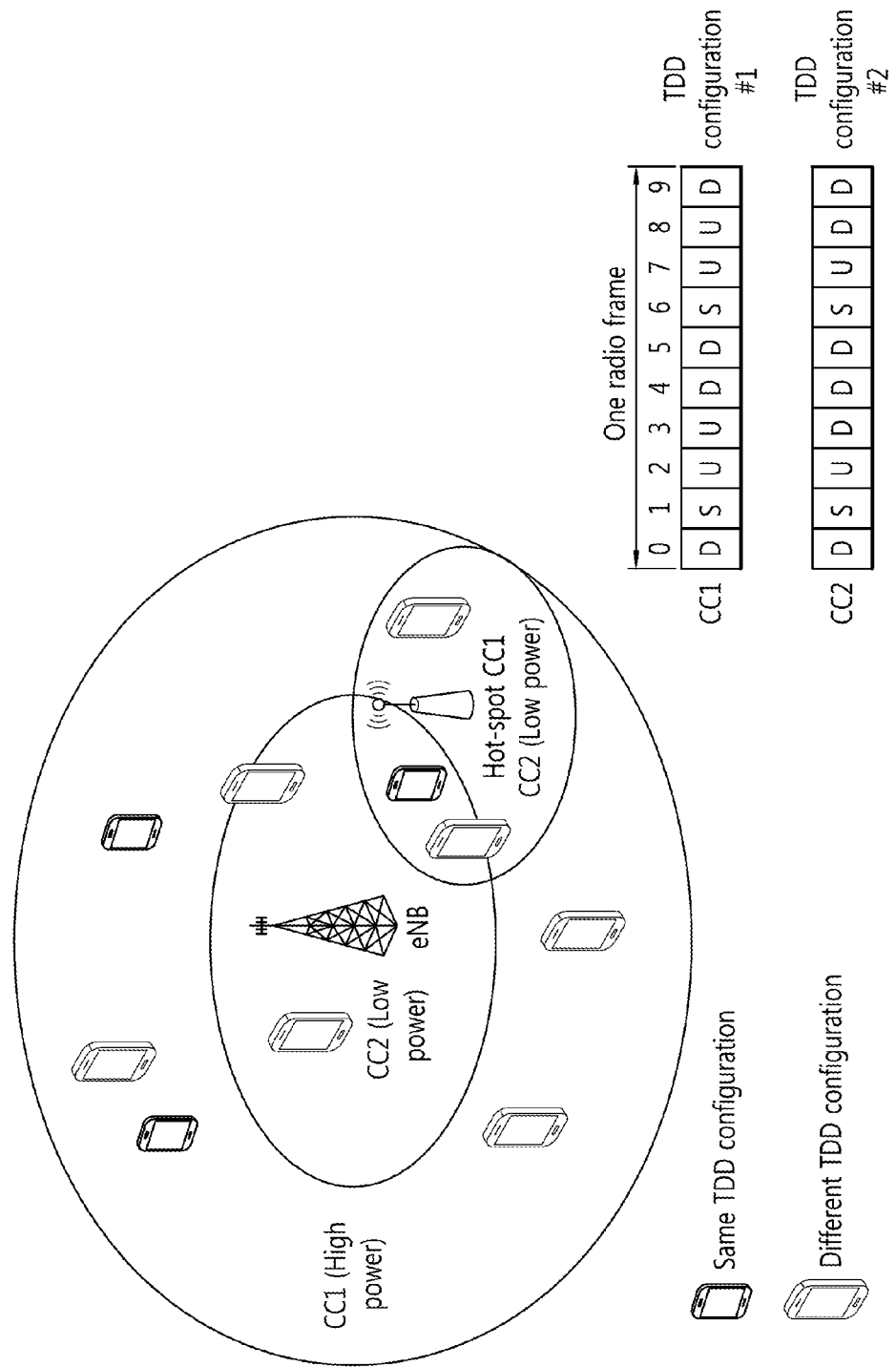
FIG. 4 illustrates a case of an inter-band CA of serving cells having different TDD UL-DL configurations.

FIG. 4 illustrates a case of an inter-band CA of serving cells having different TDD UL-DL configurations.

Referring to FIG. 4, component carriers that configure a CA with a terminal are CC1 and CC2, the CC1 may be configured as UL-DL configuration #1 and CC2 may be configured as UL-DL configuration #2, for the purpose of traffic adaptation (semi-static) and avoidance of interference between heterogeneous networks. For example, to avoid an interference issue with other TDD systems (for example, TDS-CDMA, WiMAX, and the like) that co-exist in an identical band, different UL-DL configurations may be required in an inter-band CA. In addition, when a UL-DL configuration including a large number of UL subframes is applied to a low frequency band, and a UL-DL configuration including a small number of UL subframes is applied to a high frequency band, it may be helpful for the coverage enhancement.

For the TDD, when a terminal is configured with one or more serving cells, at least two serving cells have different UL-DL configurations, and one of the serving cells is a PCell, a UL-DL configuration of the PCell is a DL reference UL-DL configuration. Here, the DL reference UL-DL configuration indicates a UL-DL configuration used as a reference for a DL HARQ timing of a serving cell.

Meanwhile, for the TDD, when a terminal is configured with two or more serving cells, at least two serving cells have different UL-DL configurations, and one of the serving cells is an SCell, a DL reference UL-DL configuration for the SCell is as shown in the following Table 4.

TABLE 4

| Set # | (Primary cell UL/DL configuration, Secondary cell UL/DL configuration) | DL-reference UL/DL configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

In Table 4, based on a pair of a PCell UL-DL configuration and an SCell UL-DL configuration, the DL reference UL-DL configuration for the SCell may be indicated.

For example, when the pair of the PCell UL-DL configuration and the SCell UL-DL configuration of Table 4 belongs to Set 1, the DL reference UL-DL configuration for the SCell applies a DL HARQ timing based on the DL reference UL-DL configuration for Set 1. In this instance, it is irrespective of a scheduling method.

Alternatively, in a case in which self-scheduling is set for a terminal, when the pair of the PCell UL-DL configuration and the SCell UL-DL configuration belongs to Set 2 or Set 3, a DL reference UL-DL configuration of Set 2 or Set 3 is used. Here, when self-scheduling is set for the terminal, it indicates that the terminal is not set to monitor a PDCCH/EPDCCH of another serving cell for scheduling of a corresponding serving cell.

Alternatively, in a case in which cross-carrier scheduling is set for a terminal, when the pair of the PCell UL-DL configuration and the SCell UL-DL configuration belongs to Set 4 or Set 5, a DL reference UL-DL configuration of Set 4 or Set 5 is used. Here, when cross-carrier scheduling is set for the terminal, it indicates that the terminal is set to monitor a PDCCH/EPDCCH of another serving cell for scheduling of a corresponding serving cell.

That is, the DL reference UL-DL configuration of Set 1 is applied when a corresponding pair is satisfied, irrespective of whether a Carrier Indicator Field (CIF) indicating a carrier associated with scheduling is configured. Conversely, Set 2 and Set 3 are applied to only a terminal for which a CIF is not configured, and Set 4 and Set 5 are applied to only a terminal for which a CIF is configured.

An ACK/NACK signal with respect to a PDCCH/EPDCCH that indicates a PDSCH or SPS release corresponding to each of a plurality of serving cells of a CA may be transmitted at the above described HARQ timing.

Figure 5:
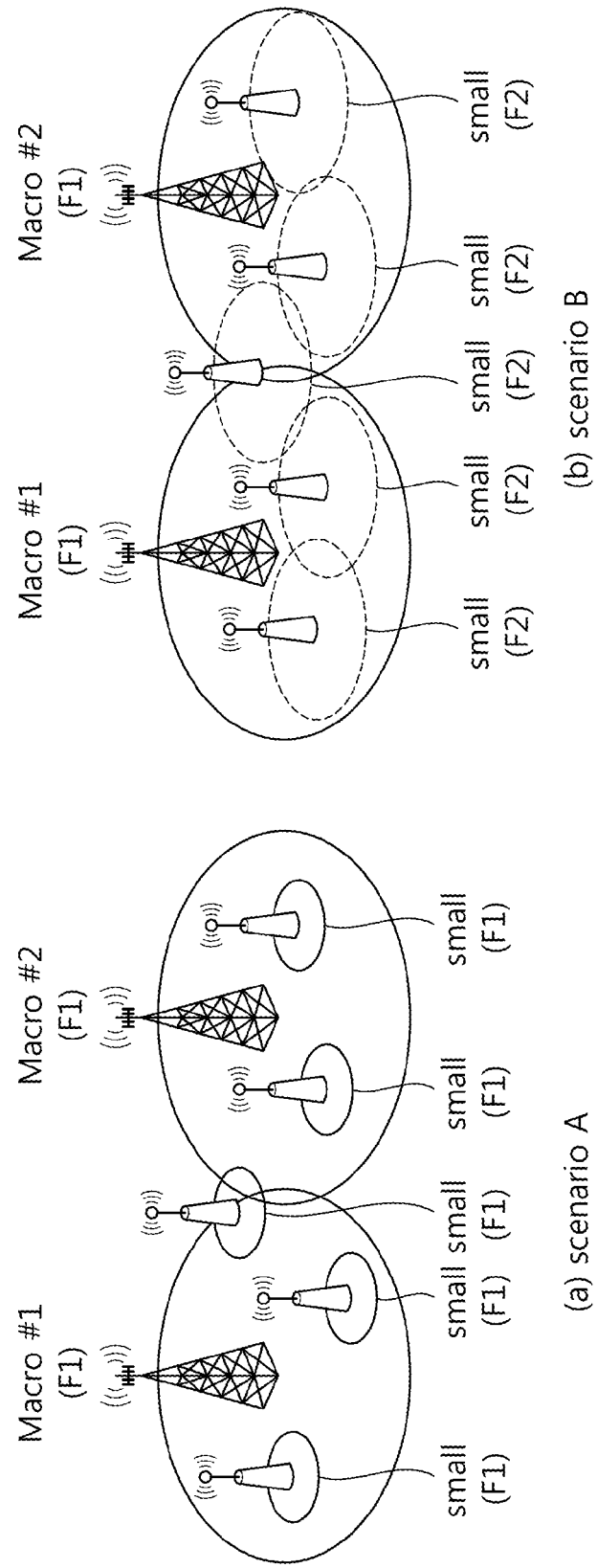
FIG. 5 illustrates an example of a deployment scenario according to an exemplary embodiment of the present invention.

FIG. 5 illustrates an example of a deployment scenario according to an embodiment of the present invention.

Referring to FIG. 5, a plurality of macro cells and a plurality of small cells (for example, picocells or femtocells) may be disposed, having an identical frequency or adjacent frequencies. (a) A deployment scenario in which a plurality of outdoor small cells use a frequency band identical to a frequency band of macro cells (b) A deployment scenario in which a plurality of small cells use an identical frequency band, macro cells use a frequency band adjacent to the frequency band of the small cells, all of the macro cells have an identical UL-DL configuration, and the small cells may adjust a UL-DL configuration FIG. 6 is a diagram illustrating an example of an FDD-TDD CA method application according to an exemplary embodiment of the present invention.

Figure 6:
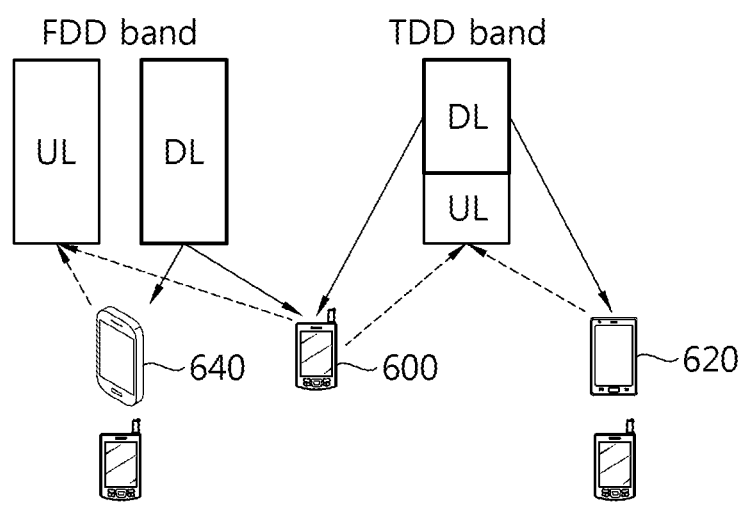
FIG. 6 illustrates an example of an FDD-TDD CA scheme according to an exemplary embodiment of the present invention.
Figure 6:
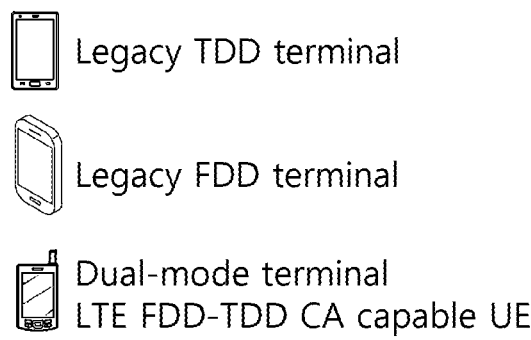

Referring FIG. 6, in case of the TDD legacy UE 620, wireless communication service can only be received through the TDD band, and in case of the legacy FDD UE 640, wireless communication service can only be received through the FDD band. On other hands, in case of the FDD-TDD CA capable UE 600, wireless communication service may be received through the FDD and the TDD bands, and also the CA based wireless communication service is provided through the TDD band carrier and the FDD band carrier.

For those aforementioned TDD-FDD CA, for example, the following deployments may be considered.

As an example, the FDD base station and the TDD base station is co-located (for example, CA scenarios 1 through 3), or the FDD base station and the TDD based station is not co-located, but connected through the ideal backhaul (for example, CA scenario 4).

As another example, the FDD base station and the TDD base station is not co-located, and connected through non-ideal backhaul (for example, small cell scenario 2a, 2b, and macro-macro scenario).

However, for the TDD-FDD CA, it is desirable that the TDD base station and the FDD base station is connected through the ideal backhaul and the TDD cell and the FDD cell is operated as synchronized.

In addition, for the TDD-FDD CA, following prerequisite may be considered.

First, a UE supporting the FDD-TDD CA may access to the legacy FDD single mode carrier and the legacy TDD single mode carrier.

Second, the legacy FDD UEs and the UEs supporting the TDD-FDD CA may camp on and be connected to the FDD carrier which is the part of the aforementioned FDD/TDD network.

Third, the legacy TDD UEs and the UEs supporting the TDD-FDD CA may camp on and be connected to the TDD carrier which is the part of the aforementioned FDD/TDD joint operation network.

Fourth, a network architecture enhancement in order to facilitate the FDD-TDD CA, for example, with regard to the non-ideal backhaul, may be considered. However, keeping the minimal network architecture changes should be considered since it is still essential in operator's perspective.

In addition, as a UE to support the TDD-FDD CA, following UE abilities may be considered.

Figure 7:
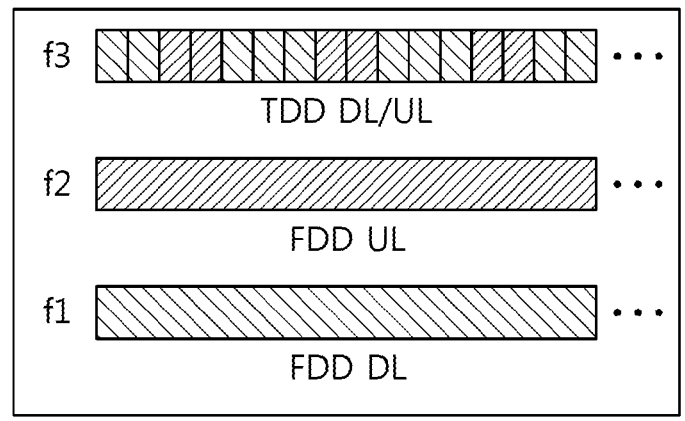
FIG. 7 illustrates examples of capabilities of a terminal for a TDD-FDD CA according to an exemplary embodiment of the present invention.
Figure 7:
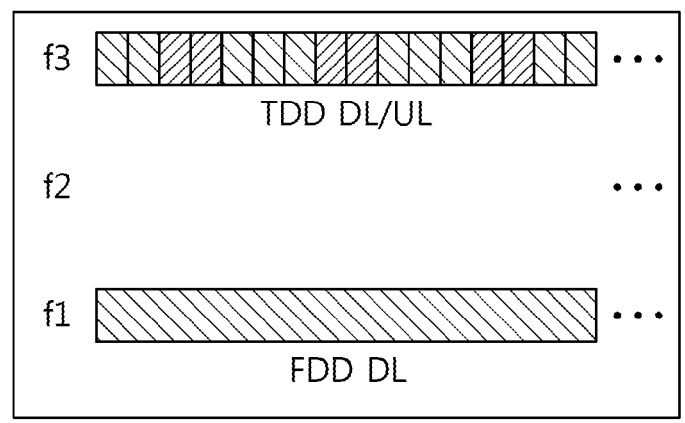
Figure 7:
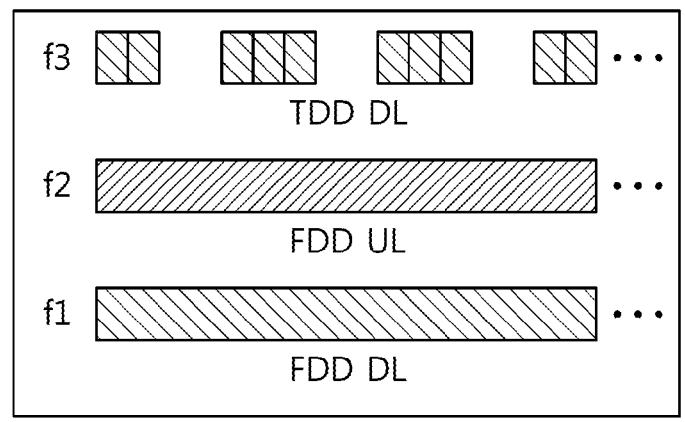

FIG. 7 is examples of UE capabilities for the TDD-FDD CA according to an exemplary embodiment of the present invention.

Referring to FIG. 7, (a) indicates that a UE is supporting the CA between the TDD carrier and the FDD carrier; (b) indicates that a UE is supporting the CA between the TDD carrier and the FDD DL carrier; and (c) indicates that a UE is supporting the CA between the TDD carrier with a DL subframe and the FDD carrier.

As mentioned above, a UE may support different types of the TDD-FDD CA, and further, it may perform simultaneous reception (that is, DL aggregation) from the FDD and TDD carriers. Secondly, a UE may perform simultaneous transmission (that is, UL aggregation) from the FDD and TDD carriers, and thirdly, a UE may perform simultaneous transmission and reception (that is, full duplex) from the FDD and TDD carriers.

In the above described TDD-FDD CA, a maximum number of aggregated Component Carriers (CCs) may be, for example, 5. In addition, an aggregation of different UL-DL configurations for TDD carriers of different bands may be supported.

In this instance, the FDD-TDD CA-capable terminal may support the TDD-FDD DL CA and may not support the TDD-FDD UL CA. The FDD-TDD CA-capable terminal may support at least the TDD-FDD DL CA, but may or may not support the TDD-FDD UL CA.

Meanwhile, a UE may configure a dual connectivity through two or more base stations among base stations that may include at least one serving cell. A dual connectivity is an operation that the UE utilizes wireless resources provided by at least two different network points (for example, a macro base station or a small base station) in RRC CONNECTED mode. In this case, those abovementioned two different network points may be connected by a non-ideal backhaul. Here, one of those abovementioned two different network points may refer to a macro base station (or a master base station or an anchor base station), remaining network points may refer to small base stations (or secondary base stations or assisting base stations, or slave base stations).

A UE, as mentioned above, may support a TDD-FDD joint operation when the CA and/or dual connectivity is configured to the UE. Hereinafter, aspects of the present invention will be explained based on a case where a UE configured to the CA, but aspects of the present invention may be applied to a case of a UE configured to the dual connectivity.

The TDD-FDD CA may include an environment in which a PCell operates as TDD and an SCell operates as FDD. The environment is irrespective of a scheduling scheme, but has a high probability of being provided when self-scheduling is used. Hereinafter, a DL HARQ timing to be applied to an SCell based on a relationship with a PCell which is a PUCCH transmission serving cell, will be described.

FIG. 8 illustrates an example of a DL HARQ timing when a terminal for which a TDD-FDD CA is configured operates based on self-scheduling. FIG. 8 corresponds to a case in which a PCell is configured as TDD UL-DL configuration 1, and an SCell is configured as FDD.

When the terminal operates based on self-scheduling as shown in FIG. 8, an existing FDD DL HARQ timing may be applied to an SCell. However, in this instance, the PCell which is a PUCCH transmission serving cell is configured as TDD and thus, this may result in failure of transmission of a PDSCH in many DL subframes by taking into account of a location of a UL subframe of the PCell. This may deteriorate a peak data rate that a single terminal may support.

Figure 9:
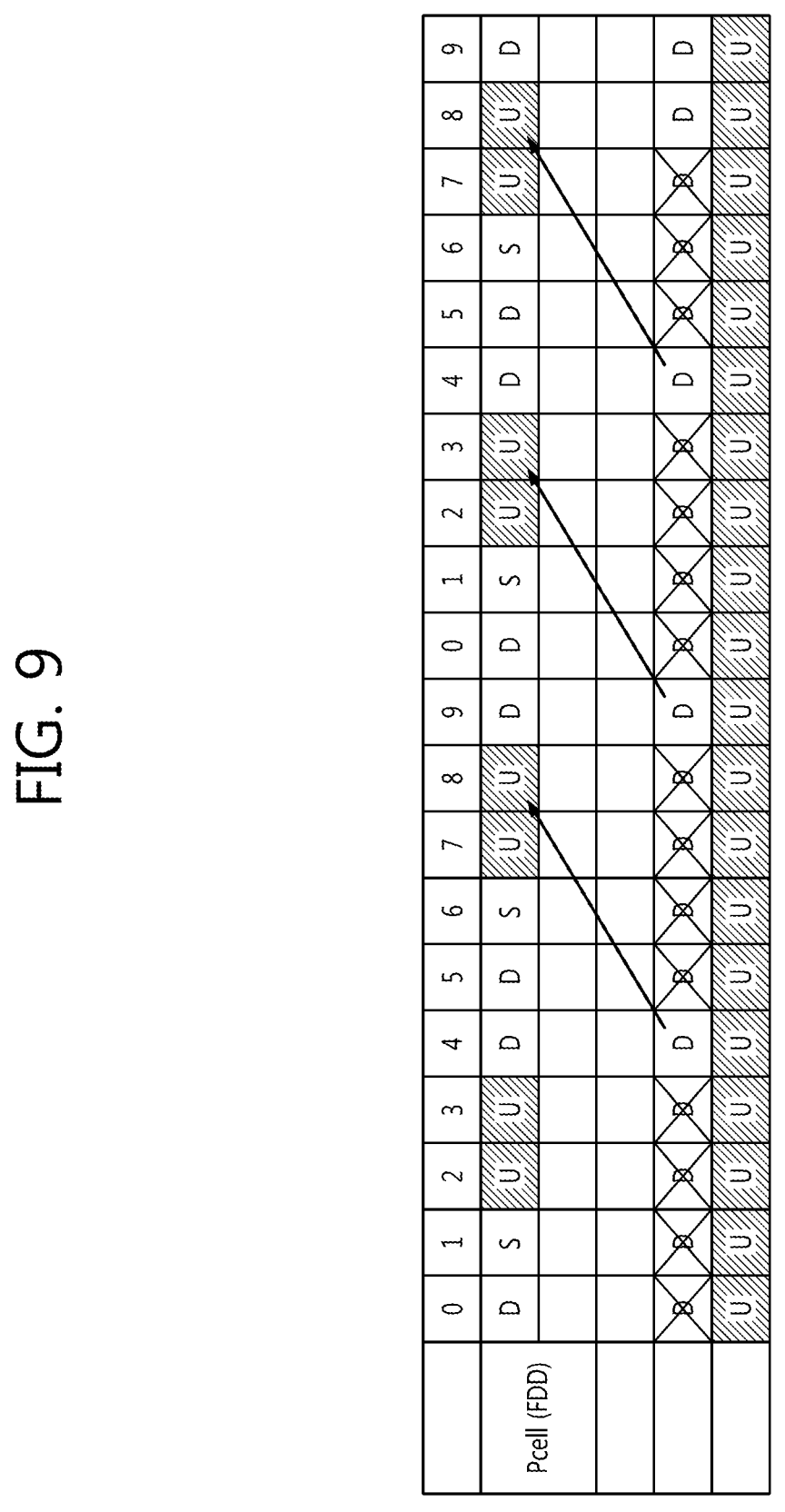

FIG. 9 illustrates an example of a DL HARQ timing when a terminal for which a TDD-FDD CA is configured operates based on cross-carrier scheduling. FIG. 9 corresponds to a case in which a PCell is configured as TDD UL-DL configuration 1, and an SCell is configured as FDD.

When a cross-carrier scheduling is configured for the terminal and an existing FDD DL HARQ timing is applied to the SCell, as shown in FIG. 9, the PCell which is a PUCCH transmission serving cell is configured as TDD and thus, this may result in failure of transmission of a PDSCH in many DL subframes due to a lack of a DL scheduling indicating method in addition to the drawback of the PCell for the PUCCH transmission. For example, in a case of self-scheduling, a terminal may receive a PDSCH and a PDCCH/EPDCCH that indicates the PDSCH on a subframe 3 of the SCell, and may transmit a HARQ ACK/NACK with respect to the reception to a base station on a subframe 7 of the PCell. However, in a case of cross-carrier scheduling, a subframe 3 of the PCell having TDD UL-DL configuration 1 is a DL subframe and thus, a PDCCH/EPDCCH indicating the PDSCH is not transmitted and thus, the terminal may not transmit a HARQ ACK/NACK on the subframe 7 of the PCell.

As illustrated in FIGS. 8 and 9, a drawback of a DL HARQ timing for a PDSCH transmitted on an SCell (FDD) exists in all scheduling schemes in the TDD-FDD CA environment. To overcome the drawback, a new DL HARQ timing for an SCell needs to be designed. Designing a new DL HARQ timing includes adding a new DL HARQ timing for the TDD or employing a new DL HARQ timing for the TDD-FDD CA.

By taking into consideration the designed new HARQ timing, there is a desire for a method and apparatus for transmitting a HARQ ACK/NACK with respect to a PDSCH of all of the DL subframes on a serving cell that operates based on FDD. Therefore, the present invention provides an improved method and apparatus for transmitting a HARQ ACK/NACK, which may be applicable to the TDD-FDD CA. In addition, the present invention provides an improved method and apparatus for receiving a HARQ ACK/NACK, which may be applicable to the TDD-FDD CA.

At least one of the following conditions may be used to define a new DL HARQ timing.

i) A new DL HARQ timing may be defined or designed to allow PDSCH transmission in all DL subframes of an SCell (FDD). This may optimize performance of the overall system and a peak data rate of a terminal.

ii) A terminal that supports TDD(PCell)-FDD(SCell) CA may use PUCCH format 1b with channel selection That is, a channel selection-based transmission method that uses PUCCH format 1b format may be configured for a terminal, for transmission of HARQ-ACK information on a PUCCH during a CA.

iii) Since a new DL HARQ timing is added, DL HARQ timing values for indicating DL subframes associated with a single UL subframe may be identified as a legacy DL HARQ timing value and a new DL HARQ timing value. Accordingly, the DL subframes may be distinguished as a DL subframe associated with a legacy DL HARQ timing (hereinafter, legacy associated subframe) and a DL subframe associated with a new DL HARQ timing (hereinafter, new associated subframe). Accordingly, a new index $k_0'$, $k_1'$, . . . for indicating a new associated subframe may be added to a DL subframe set $K=\{k_0, k_1, \ldots, K_{M-1}\}$ associated with a current UL subframe.

iv) HARQ ACKs/NACKs may be bundled between a legacy associated subframe and a new associated subframe, based on a ratio of 1:1 or N:1. In this instance, a DL assignment index (DAI) for the bundled DL subframes may be fixed to be identical. According to the above, the number of bits used for the DAI is maintained, and the number of HARQ-ACK(j) may be maintained constantly to use the channel selection-based transmission method. Here, HARQ ACK/NACK bundling may include time bundling, spatial bundling, or a combination of time bundling and spatial bundling.

v) HARQ ACK/NACK bundling between a legacy associated subframe and a new associated subframe may be executed when a PDCCH and/or an EPDCCH that indicates PDSCH transmission exists in all of the legacy associated subframes and the new associated subframe (that is, a case in which a DAI value of 5 exists when M=5). That is, when PDSCH transmission is available in all of the legacy associated subframes and all of the new associated subframes associated with a predetermined UL subframe, a HARQ ACK/NACK for a PDSCH of a new associated subframe may be bundled with a HARQ ACK/NACK of a PDSCH of at least one legacy associated subframe.

Otherwise, HARQ ACK/NACK bundling may not be executed between a legacy associated subframe and a new associated subframe. That is, HARQ ACK/NACK transmission identical to the existing method may be executed.

vi) A HARQ ACK/NACK may be transmitted through PUCCH format 1b based on channel selection or may be transmitted through a PUSCH based on whether PUSCH transmission exists. The HARQ ACK/NACK transmission may be executed on a PCell or an SCell. However, it is basically understood that the HARQ ACK/NACK transmission is executed on the PCell.

Figure 11:
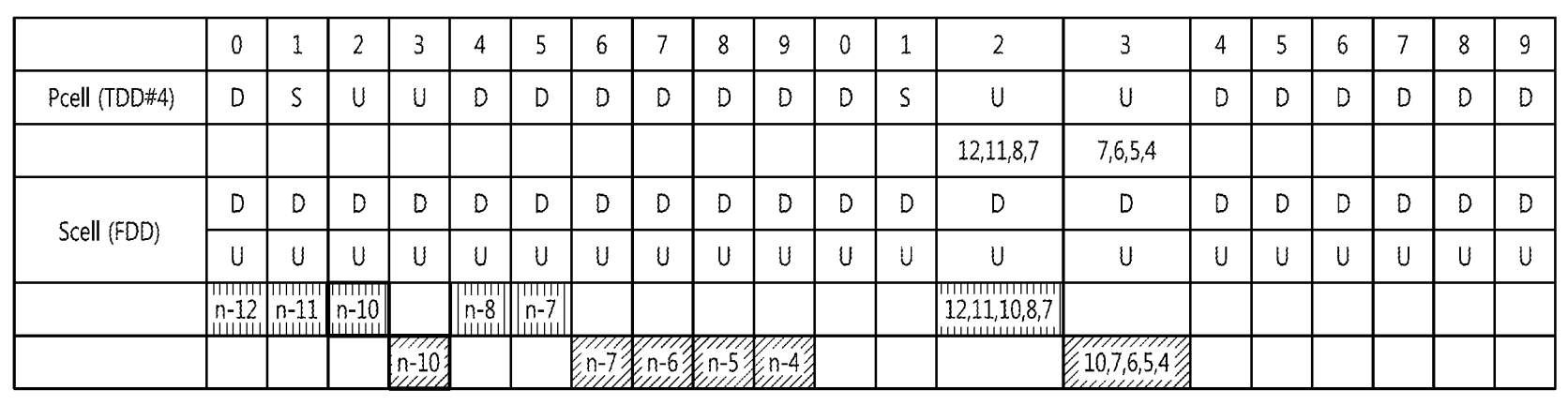

FIGS. 10 and 11 are diagrams illustrating a new DL HARQ timing according to an embodiment of the present invention. FIG. 10 corresponds to a case in which UL/DL configuration 2 is applied to a PCell, and FIG. 11 corresponds to a case in which UL/DL configuration 4 is applied to a PCell.

Referring to FIG. 10, the PCell operates based on TDD, and the UL-DL configuration 2 is applied to the PCell. FDD is applied to an SCell. A subframe set of subframes associated with subframes #2 and #7 is a subframe set K={8, 7, 6, 5, 4}. Among the set, k=8, 7, 4, 6 correspond to legacy DL HARQ timings indicating legacy associated subframes (identical to Table 3), and k=5 corresponds to a new DL HARQ timing indicating a new associated subframe (a modification of Table 3). That is, according to the design that further includes the new DL HARQ timing, UL subframes #2 and #7 of the PCell are associated with five DL subframes, respectively. That is, in a case in which a bundling window size M (or the number of k in the set K) defined for the legacy associated subframes is 4, an event of M>4 may be incurred after a new associated subframe is added.

Subframes associated with the subframe #2 are DL subframes #4, #5, #6, #7, and #8 of a previous frame, and subframes associated with the subframe #7 are a DL subframe #9 of the previous frame and DL subframes #0, #1, #2, and #3 of a current frame. Therefore, all of the subframes of the SCell are secured as DL HARQ timings. Here, among the DL HARQ timings, the DL subframes #2 and #7 correspond to new associated subframes.

Referring to FIG. 11, the PCell operates based on TDD, and the UL-DL configuration 4 is applied to the PCell. FDD is applied to an SCell. A subframe set of subframes associated with a subframe #2 is subframe set K={12, 11, 10, 8, 7}. Among the set, k=12, 11, 8, 7 correspond to legacy DL HARQ timings indicating legacy associated subframes (identical to Table 3), and k=10 corresponds to a new DL HARQ timing indicating a new associated subframe (a modification of Table 3). A subframe set of subframes associated with a subframe #3 is a subframe set K={10, 7, 6, 5, 4}. Among the set, k=7, 6, 5, 4 correspond to legacy DL HARQ timings indicating legacy associated subframes, and k=10 corresponds to a new DL HARQ timing indicating a new associated subframe.

That is, according to the design that further includes the new DL HARQ timing, UL subframes #2 and #3 of the PCell are associated with five DL subframes, respectively. That is, in a case in which a bundling window size M (or the number of k in the set K) defined for the legacy associated subframes is 4, an event of M>4 may be incurred after a new associated subframe is added.

Subframes associated with the subframe #2 are DL subframes #0, #1, #2, #4, and #5 of a previous frame, and subframes associated with the subframe #3 are DL subframes #3, #6, #7, #8, and #9 of the previous frame.

Therefore, all of the subframes of the SCell are secured as DL HARQ timings. Here, among the DL HARQ timings, the DL subframes #2 and #3 correspond to new associated subframes.

When only legacy associated subframes are used, HARQ for PDSCH transmission may not be supported in a few DL subframes of the SCell. Therefore, as illustrated in FIGS. 10 and 11, a new associated subframe is for a DL subframe that is not supportable through the existing TDD UL-DL configuration, and thereby, HARQ for PDSCH transmission may be supported in all of the DL subframes of the SCell.

Accordingly, new associated subframes may be added to the set K associated with a single UL subframe. This may indicate that an additional HARQ ACK/NACK for the new associated subframe needs to be transmitted. To this end, the bundling window size M needs to be increased or a DAI with an increased number of bits (for example, 3 bits for a DAI) may be used, so as to add a HARQ ACK/NACK. However, an overhead may be incurred in a PDCCH from a perspective of a DL and an overhead in resources for an additional HARQ ACK/NACK may be caused from a perspective of a UL. Therefore, there is a desire for a method of transmitting an additional HARQ ACK/NACK for a new associated subframe, without a change in the existing communication protocol.

The present embodiment provides a method of bundling a HARQ ACK/NACK with respect to a new associated subframe (hereinafter new HARQ ACK/NACK) and a HARQ ACK/NACK with respect to a legacy associated subframe (hereinafter legacy HARQ ACK/NACK). To this end, which of the legacy HARQ ACK/NACKs is to be bundled with a new HARQ ACK/NACK and how the bundling is executed may need to be defined, that is, a bundling method needs to be defined. In addition, a method of setting a DAI value for a new associated subframe may need to be defined. The definition should be made to provide minimum effect on the existing standards.

Figure 12:
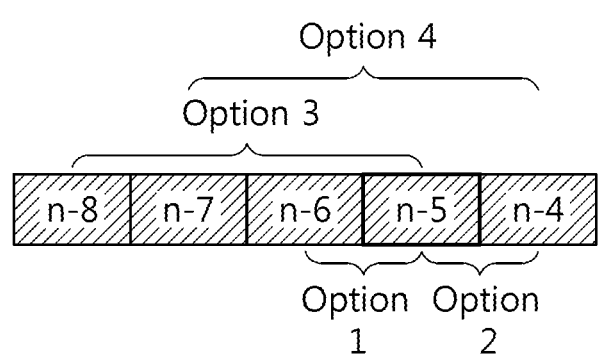
FIG. 12 is a diagram illustrating a legacy HARQ ACK/NACK that is bundled with a new HARQ ACK/NACK according to an exemplary embodiment of the present invention.

FIG. 12 is a diagram illustrating a legacy HARQ ACK/NACK that may be bundled with a new HARQ ACK/NACK according to an embodiment of the present invention. This is a case in which PUCCH format 1b with channel selection is configured for a terminal, for transmission of a HARQ ACK/NACK.

Referring to FIG. 12, legacy associated subframes are subframes n−8, n−7, n−6, and n−4, and a new associated subframe is a subframe n−5. Here, a radio of bundling between a legacy associated subframe and a new associated subframe is 1:1. That is, a single new HARQ ACK/NACK and a single legacy HARQ ACK/NACK are bundled. As a matter of course, a ratio of bundling between a legacy associated subframe and a new associated subframe may be N:1 or 1:N. By the following various options, a legacy HARQ ACK/NACK to be bundled with the new HARQ ACK/NACK may be selected.

For example, according to option 1, a HARQ ACK/NACK of the subframe n−5 (new HARQ ACK/NACK) and a HARQ ACK/NACK of the subframe n−6 (legacy HARQ ACK/NACK) may be bundled. That is, the new HARQ ACK/NACK is bundled with a HARQ ACK/NACK of an immediately previous legacy associated subframe.

As another example, according to option 2, the HARQ ACK/NACK of the subframe n−5 (new HARQ ACK/NACK) and a HARQ ACK/NACK of the subframe n−4 (legacy HARQ ACK/NACK) may be bundled. That is, the new HARQ ACK/NACK is bundled with a HARQ ACK/NACK of an immediately subsequent legacy associated subframe.

As another example, according to option 3, the HARQ ACK/NACK of the subframe n−5 (new HARQ ACK/NACK) and a HARQ ACK/NACK of the subframe n−7 (legacy HARQ ACK/NACK) may be bundled. That is, the new HARQ ACK/NACK is bundled with a HARQ ACK/NACK of a legacy associated subframe, which is two legacy associated subframes before from the new associated subframe.

As another example, according to option 4, the HARQ ACK/NACK of the subframe n−5 (new HARQ ACK/NACK) and a HARQ ACK/NACK of the subframe n−8 (legacy HARQ ACK/NACK) may be bundled. That is, the new HARQ ACK/NACK is bundled with a HARQ ACK/NACK of a legacy associated subframe, which is three legacy associated subframes before from the new associated subframe.

According to the various options, a terminal executes bundling of a HARQ ACK/NACK of one of the legacy DL subframes in the subframe set K associated with an identical UL subframe and a new HARQ ACK/NACK, so as to generate a HARQ ACK/NACK of 1 bit. Hereinafter, a HARQ ACK/NACK bundling method will be described.

In FIG. 12, it is defined that the HARQ ACK/NACK bundling is executed between subframes having fixed indices, based on four options. However, the HARQ ACK/NACK bundling may be defined based on a DAI value, as shown in FIG. 13.

Figure 13:
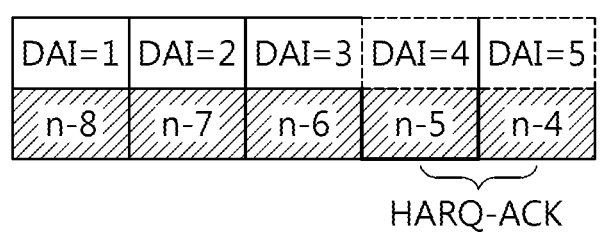
FIG. 13 is a diagram illustrating a method of bundling HARQ ACK/NACKs based on a Downlink Assignment Index (DAI) according to an exemplary embodiment of the present invention.

Referring to FIG. 13, HARQ ACK/NACK bundling may be executed between a latest DL subframe having a DAI value of 4 and a latest DL subframe having a DAI value of 5 from among DAI values ($V^{DL}_{AI,x}$) in a DL DCI format transmitted in each subframe of the associated subframe set K on a serving cell c. That is, HARQ ACK/NACK bundling may be executed between DL subframes selected based on a DAI value. In this instance, M=5 and thus, it is substantially the same as option 2 of FIG. 12, from the perspective of HARQ ACK/NACK bundling.

Figure 14:
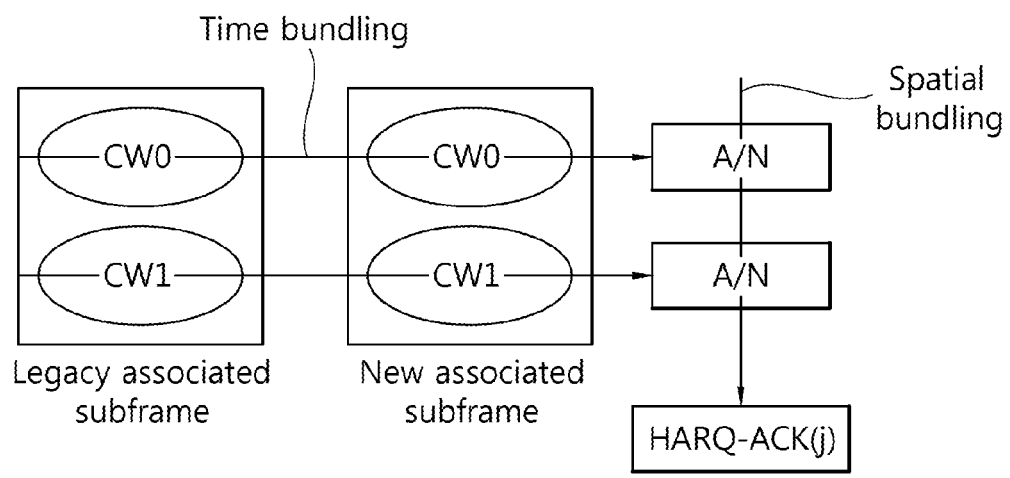
FIG. 14 is a diagram illustrating HARQ ACK/NACK bundling according to an exemplary embodiment of the present invention.

FIG. 14 is a diagram illustrating HARQ ACK/NACK bundling according to an embodiment of the present invention.

Referring to FIG. 14, under an assumption of a mode that enables a base station to transmit two TBs in a single subframe, when PDSCH transmission is indicated for two subframes, for HARQ-ACK transmission for the PDSCH transmission, HARQ ACK/NACK bundling may be executed as follows.

i) When PDSCH transmission is executed in both a legacy DL subframe and a new associated subframe, a terminal executes time bundling first with respect to each codeword over two subframes, and executes spatial bundling. For example, the terminal executes bundling of a HARQ ACK/NACK with respect to a codeword 0 (CW0) of a legacy DL subframe and a HARQ ACK/NACK with respect to a codeword 0 (CW0) of a new DL subframe, so as to obtain a first time bundled HARQ ACK/NACK, executes bundling of a HARQ ACK/NACK with respect to a codeword 1 (CW1) of a legacy DL subframe and a HARQ ACK/NACK with respect to a codeword 1 (CW1) of a new DL subframe, so as to obtain a second time bundled HARQ ACK/NACK, and executes bundling of the first time bundled HARQ ACK/NACK and the second time bundled HARQ ACK/NACK, so as to generate a HARQ-ACK(j), which is a final bundled HARQ ACK/NACK. Here, j is identical to a DAI or a DAI-1.

ii) When PDSCH transmission is executed in only one of a legacy DL subframe and a new associated subframe, a terminal executes only the spatial bundling. For example, when PDSCH transmission is executed only in the new associated subframe, the terminal executes bundling of a HARQ ACK/NACK with respect to a codeword 0 (CW0) and a HARQ ACK/NACK with respect to a codeword 1 (CW1) of the new DL subframe, so as to generate a HARQ-ACK(j), which is a final bundled HARQ ACK/NACK.

In a mode that allows a base station to transmit a single TB in a single subframe, HARQ ACK/NACK bundling may be executed as follows.

i) When PDSCH transmission is executed in both a legacy DL subframe and a new associated subframe, a terminal executes only time bundling with respect to each codeword over two subframes. For example, when it is assumed that only a codeword 0 is transmitted, the terminal executes bundling of a HARQ ACK/NACK with respect to a codeword 0 (CW0) of the legacy DL subframe and a HARQ ACK/NACK with respect to a codeword 0 (CW0) of the new DL subframe, so as to generate a HARQ-ACK(j), which is a final bundled HARQ ACK/NACK.

ii) When PDSCH transmission is executed in only one of the legacy DL subframe and the new associated subframe, the terminal does not execute any bundling.

Figure 15:
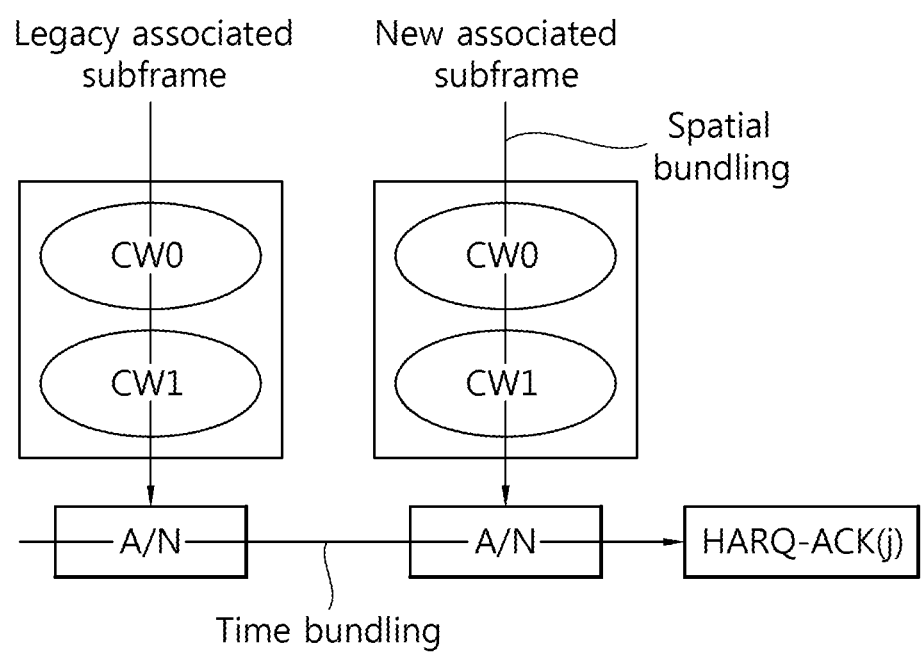
FIG. 15 is a diagram illustrating HARQ ACK/NACK bundling according to another exemplary embodiment of the present invention.

FIG. 15 is a diagram illustrating HARQ ACK/NACK bundling according to another embodiment of the present invention.

Referring to FIG. 15, in a mode that allows a base station to transmit two TBs in a single subframe, HARQ ACK/NACK bundling may be executed as follows.

i) When PDSCH transmission is executed in both a legacy DL subframe and a new associated subframe, a terminal executes spatial bundling first with respect to each codeword over two subframes, and executes time bundling. For example, the terminal executes bundling of a HARQ ACK/NACK with respect to a codeword 0 (CW0) of the legacy DL subframe and a HARQ ACK/NACK with respect to a codeword 1 (CW1) of the legacy DL subframe, so as to obtain a first spatial bundled HARQ ACK/NACK, executes bundling of a HARQ ACK/NACK of a codeword 0 (CW0) of the new DL subframe and a HARQ ACK/NACK of a codeword 1 (CW1) of the new DL subframe, so as to obtain a second spatial bundled HARQ ACK/NACK, and executes bundling of the first spatial bundled HARQ ACK/NACK and the second spatial bundled HARQ ACK/NACK, so as to generate a HARQ-ACK(j), which is a final bundled HARQ ACK/NACK. Here, j is identical to a DAI or a DAI-1.

ii) When PDSCH transmission is executed in only one of a legacy DL subframe and a new associated subframe, a terminal executes only the spatial bundling. For example, when PDSCH transmission is executed only in the new associated subframe, the terminal executes bundling of a HARQ ACK/NACK with respect to a codeword 0 (CW0) and a HARQ ACK/NACK with respect to a codeword 1 (CW1) of the new DL subframe, so as to generate a HARQ-ACK(j), which is a final bundled HARQ ACK/NACK.

Figure 16:
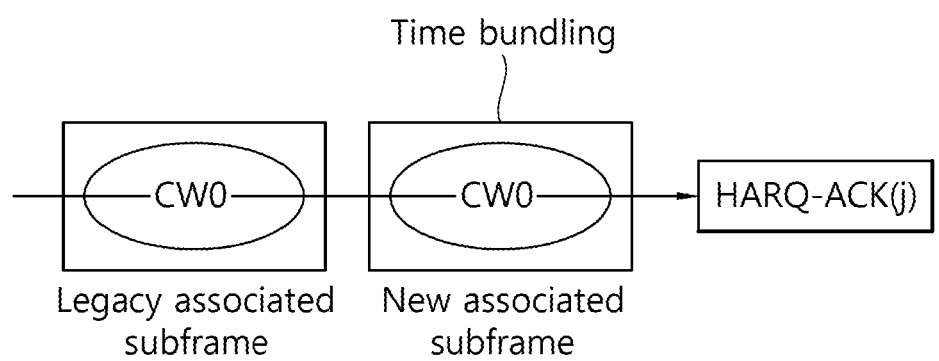
FIG. 16 is a diagram illustrating HARQ ACK/NACK bundling according to another exemplary embodiment of the present invention.

FIG. 16 is a diagram illustrating HARQ ACK/NACK bundling according to another embodiment of the present invention.

Referring to FIG. 16, in a mode that allows a base station to transmit a single TB in a single subframe, HARQ ACK/NACK bundling may be executed as follows.

i) When PDSCH transmission is executed in both a legacy DL subframe and a new associated subframe, a terminal executes only time bundling with respect to each codeword over two subframes. For example, when it is assumed that only a codeword 0 is transmitted, the terminal executes bundling of a HARQ ACK/NACK with respect to a codeword 0 (CW0) of the legacy DL subframe and a HARQ ACK/NACK with respect to a codeword 0 (CW0) of the new DL subframe, so as to generate a HARQ-ACK(j), which is a final bundled HARQ ACK/NACK.

ii) When PDSCH transmission is executed in only one of the legacy DL subframe and the new associated subframe, the terminal does not execute any bundling.

The present specification discloses a method of optionally using PUCCH format 3 in addition to the bundling method of FIGS. 14 through 16, for transmission of a new HARQ ACK/NACK.

According to an embodiment, for transmission of a new HARQ ACK/NACK with respect to a PDSCH of an SCell that operates based on FDD in a TDD-FDD CA, PUCCH format 1b with channel selection is used when a bundling window size M is less than or equal to 4, and PUCCH format 3 may be used when M is greater than 4. That is, under the condition of M>4, PUCCH format 1b with channel selection may not be configured for the TDD(PCell)-FDD(SCell) CA terminal, or may be automatically changed into PUCCH format 3 although it is configured for the TDD(PCell)-FDD (SCell) CA terminal.

Hereinafter, a method of setting a DAI value for a new associated subframe will be defined.

When the bundling window size M is changed, the transmission method using PUCCH format 1b with channel selection may need to be changed. To minimize an effect on the existing transmission method using PUCCH format 1b, the present embodiment provides a method of using a channel selection table without changing the value of M although a new associated subframe is added.

Figure 17:
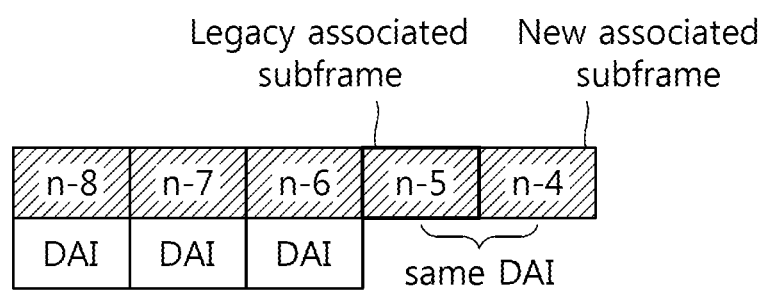
FIG. 17 is a diagram illustrating a case in which an identical DAI value is applied to subframes that are bundled according to an exemplary embodiment of the present invention.

As an example, a DAI value of a new associated subframe is identical to a DAI value of at least one legacy associated subframe, as shown in FIG. 17. A terminal and a base station should recognize that the identical DAI value is used for two or more associated subframes. According to the example, the DAI value may be accumulatively increased according to the number of PDCCHs and/or EPDCCHs that indicate PDSCH transmission. However, exceptionally, a DAI for the new associated subframe may not be accumulatively increased, and uses a DAI value of one of the legacy associated subframes. In this instance, since the case of M=5 comes from a new DL HARQ timing, the terminal may execute HARQ ACK/NACK bundling, by unifying a DAI and regarding the two subframes as a single virtual subframe.

As another example, a DAI value of a new associated subframe is different from a DAI value of a legacy associated subframe. According to the example, a DAI value has a value accumulated according to the number of PDCCHs and/or EPDCCHs indicating PDSCH transmission, and there is no exception for a DAI of the new associated subframe. This is to remove an effect on a method of transmitting a HARQ ACK/NACK using a DAI value on a PUSCH. That is, for UL-DL configurations 1 through 6, a DAI value in a DCI format may be updated for each subframe (from subframe to subframe). A terminal according to the present specification may support a case in which all of the ten subframes of an SCell are associated with a single UL subframe (that is, a new DL HARQ timing) and thus, a DAI value should indicate a maximum of ten subframes having a PDSCH. According to the above, the DAI value may be defined as shown in Table 5.

TABLE 5

| DAI MSB, LSB | $V^{UL}_{DAI}$ or $V^{DL}_{DAI}$ | Number of subframes having PDSCH and number of subframes having PDCCH/EPDCCH indicating DL SPS release |
|---|---|---|
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 |

Referring to Table 5, a DAI has 2 bits, and is formed of an MSB and an LSB. In a case in which MSB=0 and LSB=1 (that is, when a DAI value is 2), the number of subframes having a PDSCH and the number of subframes having a PDCCH/EPDCCH indicating DL SPS release may be 2, 6, or up to 10. That is, the DAI value may cover PDSCH allocation of ten subframes. In this instance, only when M=5 and DAI=5, the terminal executes HARQ ACK/NACK bundling, and a HARQ-ACK(j) index for the bundled HARQ ACK/NACK may be HARQ-ACK(3) corresponding to a DAI=4.

Figure 18:
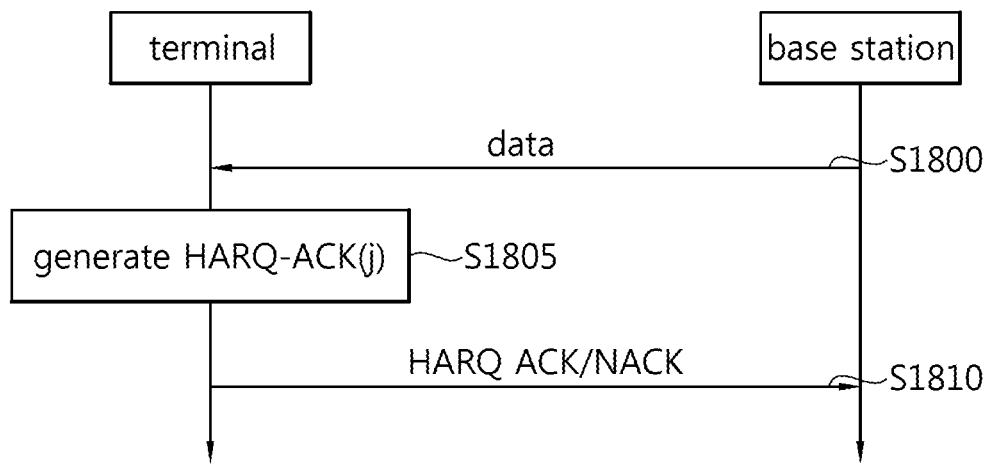
FIG. 18 is a flowchart illustrating a HARQ ACK/NACK transmission method according to an exemplary embodiment of the present invention.

FIG. 18 is a flowchart illustrating a HARQ ACK/NACK transmission method according to an embodiment of the present invention.

Referring to FIG. 18, a base station transmits data over a PCell or an SCell configured for a terminal, in operation S1800. Accordingly, the terminal receives the data transmitted over the PCell or the SCell. The PCell may operate based on a TDD mode, and the SCell may operate based on an FDD mode. The data may be referred to as a TB or a codeword, and a plurality of TBs (or codewords) may be transmitted over a single subframe (please see FIGS. 14 and 15). The data may be mapped to a PDSCH for transmission. Together with the data, a PDCCH or an EPDCCH indicating the data may be transmitted. A DCI including a DAI value may be mapped to the PDCCH. A DAI value associated with a new associated subframe, as disclosed in the present specification, may or may not be identical to a DAI value of at least one legacy associated subframe. The data may be transmitted over a plurality of subframes. The plurality of subframes may include a plurality of legacy associated subframes and at least one new associated subframe.

For example, the base station transmits a first TB in a first subframe of the SCell, transmits a second TB in a second subframe of the SCell, and transmits a third TB in a third subframe of the SCell. However, the plurality of subframes may not need to be consecutive subframes.

The terminal generates a HARQ-ACK(j) with respect to the received data in operation S1805. The HARQ-ACK(j) may be separately generated for each of the PCell and the SCell, and for each DAI. Each HARQ-ACK(j) may be indexed based on a DAI value.

First, a method of generating a HARQ-ACK (j) in the PCell will be described. In a case in which the UL-DL configuration of the PCell corresponds to UL-DL configuration 1, 2, 3, 4, 5, or 6, and $0 \le j \le M-1$, when a PDCCH and/or EPDCCH of an associated subframe and PDSCH transmission exist in the PCell, and a DAI value in the PDCCH and/or EPDCCH is j+1, the terminal generates a HARQ-ACK(j) indicating ACK, NACK, or DTX with respect to data in each associated subframe. In a case in which $0 \le j \le M-1$ and the UL-DL configuration of the PCell corresponds to UL-DL configuration 0, when a PDCCH and/or EPDCCH of an associated subframe and PDSCH transmission exist, the terminal sets the HARQ-ACK(0) as ACK, NACK, or DTX with respect to corresponding data, and for the rest, the terminal sets HARQ-ACK(j) as DTX.

Subsequently, a method of generating a HARQ-ACK (j) in the SCell will be described. In a case of $0 \le j \le M-1$, when a PDCCH and/or EPDCCH of an associated subframe and PDSCH transmission exist in the SCell, and a DAI value in the PDCCH and/or EPDCCH is j+1, the terminal generates a HARQ-ACK(j) indicating ACK, NACK, or DTX with respect to data in each associated subframe.

The terminal generates HARQ-ACK(0), HARQ-ACK(1), . . . which are indexed by a DAI value, with respect to data received through associated subframes of the PCell, and generates HARQ-ACK(0), HARQ-ACK(1), . . . which are indexed by a DAI value, with respect to data received through associated subframes of the SCell. For example, a combination of four HARQ-ACK(j)s may exist in the PCell, and a combination of four HARQ-ACK(j)s may exist in the SCell. A combination of eight HARQ-ACK(j)s may be transmitted through a single UL subframe. Throughout the present specification, in the expression "a HARQ ACK/NACK is transmitted through a single UL subframe", the "HARQ ACK/NACK" may refer to a combinations of a plurality of HARQ-ACK(j)s.

Here, the terminal may execute HARQ ACK/NACK bundling based on one of the all embodiments disclosed in the present specification. That is, when M=5 and DAI=5 on the SCell, an HARQ-ACK(j) indexed by a DAI associated with a new associated subframe may be bundled with a HARQ-ACK(j') of at least one legacy associated subframe. For example, a HARQ-ACK(3) corresponds to a DAI value of 4, which is a result of bundling between a HARQ ACK/NACK with respect to a PDSCH of a legacy associated subframe having a DAI=4 and a HARQ ACK/NACK with respect to a PDSCH of a new associated subframe having a DAI=5.

The terminal transmits the HARQ ACK/NACK to the base station in a predetermined UL subframe, in operation S1810. The HARQ ACK/NACK may be transmitted through PUCCH format 1b with channel selection, or may be transmitted on a PUSCH.

As an example, the terminal may transmit the HARQ ACK/NACK to the base station using a PUCCH resource index $n^{(1)}_{HYXXH,i}$ and a modulation symbol, corresponding to the HARQ-ACK(j). When M=5 and DAI=5 exists on the SCell, a channel selection table to which the HARQ-ACK(j) and PUCCH resource index/modulation symbol are mapped, may be used. An example of the channel selection table may be as shown in Table 6.

TABLE 6

| PCell | SCell | resource | constellation | RM code input bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n^{(1)}_{PUCCH}$ | b(0), b(1) | o(0), o(1), o(2), (3) |

TABLE 6-continued

| PCell | SCell | resource | constellation | RM code input bits |
|---|---|---|---|---|
| ACK, ACK, ACK, NACK/DTX | ACK, ACK, ACK, NACK/DTX | $n^{(1)}_{PUCCH,1}$ | 1, 1 | 1, 1, 1, 1 |
| ACK, ACK, NACK/DTX, any | ACK, ACK, ACK, NACK/DTX | $n^{(1)}_{PUCCH,1}$ | 0, 0 | 1, 0, 1, 1 |
| ACK, DTX, DTX, DTX | ACK, ACK, ACK, NACK/DTX | $n^{(1)}_{PUCCH,3}$ | 1, 1 | 0, 1, 1, 1 |
| ACK, ACK, ACK, ACK | ACK, ACK, ACK, NACK/DTX | $n^{(1)}_{PUCCH,3}$ | 1, 1 | 0, 1, 1, 1 |
| NACK/DTX, any, any, any | ACK, ACK, ACK, NACK/DTX | $n^{(1)}_{PUCCH,3}$ | 0, 1 | 0, 0, 1, 1 |
| (ACK, NACK/DTX, any, any), except for (ACK, DTX, DTX, DTX) | ACK, ACK, ACK, NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, DTX, DTX, DTX | ACK, ACK, ACK, ACK | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |
| ACK, ACK, ACK, NACK/DTX | NACK/DTX, any, any, any | $n^{(1)}_{PUCCH,1}$ | 1, 0 | 1, 1, 0, 0 |
| ACK, ACK, ACK, NACK/DTX | (ACK, NACK/DTX, any, any), except for (ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any | $n^{(1)}_{PUCCH,1}$ | 0, 1 | 1, 0, 0, 0 |
| ACK, ACK, NACK/DTX, any | (ACK, NACK/DTX, any, any), except for (ACK, DTX, DTX, DTX) | $n^{(1)}_{PUCCH,1}$ | 0, 1 | 1, 0, 0, 0 |
| ACK, DTX, DTX, DTX | NACK/DTX, any, any, any | $n^{(1)}_{PUCCH,0}$ | 1, 1 | 0, 1, 0, 0 |
| ACK, DTX, DTX, DTX | (ACK, NACK/DTX, any, any), except for (ACK, DTX, DTX, DTX) | $n^{(1)}_{PUCCH,0}$ | 1, 1 | 0, 1, 0, 0 |
| ACK, ACK, ACK, ACK | NACK/DTX, any, any, any | $n^{(1)}_{PUCCH,0}$ | 1, 1 | 0, 1, 0, 0 |
| ACK, ACK, ACK, ACK | (ACK, NACK/DTX, any, any), except for (ACK, DTX, DTX, DTX) | $n^{(1)}_{PUCCH,0}$ | 1, 1 | 0, 1, 0, 0 |
| NACK, any, any, any | NACK/DTX, any, any, any | $n^{(1)}_{PUCCH,0}$ | 0, 0 | 0, 0, 0, 0 |
| NACK, any, any, any | (ACK, NACK/DTX, any, any), except for (ACK, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | NACK/DTX, any, any, any | $n^{(1)}_{PUCCH,0}$ | 0, 0 | 0, 0, 0, 0 |

TABLE 6-continued

| PCell | SCell | resource | constellation | RM code input bits |
|---|---|---|---|---|
| (ACK, NACK/DTX, any, any), except for (ACK, DTX, DTX, DTX) | (ACK, NACK/DTX, any, any), except for (ACK, DTX, DTX, DTX) | $n^{(1)}_{PUCCH,0}$ | 0, 0 | 0, 0, 0, 0 |
| DTX, any, any, any | NACK/DTX, any, any, any | | No Transmission | 0, 0, 0, 0 |
| DTX, any, any, any | (ACK, NACK/DTX, any, any), except for (ACK, DTX, DTX, DTX) | | No Transmission | 0, 0, 0, 0 |

Referring to Table 6, a combination of four HARQ-ACK(j)s exists in the PCell, and a combination of four HARQ-ACK(j)s exists in the SCell. A combination of eight HARQ-ACK(j)s is mapped to an actual physical resource for transmission, a combination of HARQ-ACK(j)s may be indicated by a constellation of a PUCCH resource index, which is an actual physical resource, and a modulation symbol.

For example, when HARQ-ACK(j)={ACK, ACK, ACK, NACK/DTX} in the PCell and HARQ-ACK(j)={ACK, ACK, ACK, NACK/DTX} in the SCell, a combination of the HARQ-ACK(j)s may be mapped to $n^{(1)}_{\Pi YXXH,1}$ and modulation symbol constellation (1,1). For example, a HARQ-ACK(3) in the SCell corresponds to a DAI value of 4, which is a result of bundling between a HARQ ACK/NACK with respect to a PDSCH of a legacy associated subframe having a DAI=4 and a HARQ ACK/NACK with respect to a PDSCH of a new associated subframe having a DAI=5.

The resource index $n^{(1)}_{\Pi YXXH,\iota}$, which is a resource for PUCCH format 1/1a/1b transmission, may be used for determining a Cyclic Shift (CS) amount $\alpha(n_\sigma,1)$ of a base sequence and an orthogonal sequence index $n_{OX}(n_o)$, in addition to a location of the physical resource through which a HARQ ACK/NACK signal is transmitted. Control information transmitted on a PUCCH may use a cyclically shifted sequence, and the cyclic shift sequence is obtained by cyclically shifting a base sequence by a predetermined CS amount.

For example, the resource index $n^{(1)}_{\Pi YXXH,\iota}$ may be obtained as shown in Table 7. The resource index $n^{(1)}_{\Pi YXXH,\iota}$ is a parameter that determines a physical RB index $n_{\Pi PB}$, a CS amount $\alpha(n_\sigma,1)$ of a base sequence, an orthogonal sequence index $n_{OX}(n_o)$, and the like.

TABLE 7

| | dynamic scheduling | Semi-static scheduling |
|---|---|---|
| Resource index | $n^{(1)}_{PUCCH,i} = (M_{primary}-m-1)N_c + mN_{c+1} + n_{CCE,M} + N^{(1)}_{PUCCH}$ | Signaling through higher layer or control channel |
| Upper layer Signaling value | $n^{(1)}_{PUCCH}$ | $n^{(1)}_{PUCCH}$ |

Referring to Table 7, c is one of 0, 1, 2, and 3, and $N_\chi \leq n_{XXE,M} \leq N_{X+1}$. Also, $N_\chi = \max\{0, \lfloor [N_{RB}^{DL} \cdot (N_{sc}^{RB} \cdot c - 4)]/36 \rfloor\}$. i is a parameter that is determined dependently, based on a DAI value, and may have 0, 1, 2, and 3. According to the above, a HARQ ACK/NACK signal with respect to a PDSCH transmitted in a $n^{th}$ subframe, may be calculated based on a function of a first Control Channel Element (CCE) index $n_{XXE,M}$ of a PDCCH transmitted in a n-$k^{th}$ subframe and $N^{(1)}_{\Pi YXXH}$ obtained through a higher layer signaling or a separate control channel.

From the perspective of a physical resource, a Reference Signal (RS) is contained in three SC-FDMA symbols of seven SC-FDMAs, and a HARQ ACK/NACK signal is contained in the remaining four SC-FDMA symbols. The RS may be included in the three contiguous SC-FDMA symbols in the middle of a slot.

Figure 19:
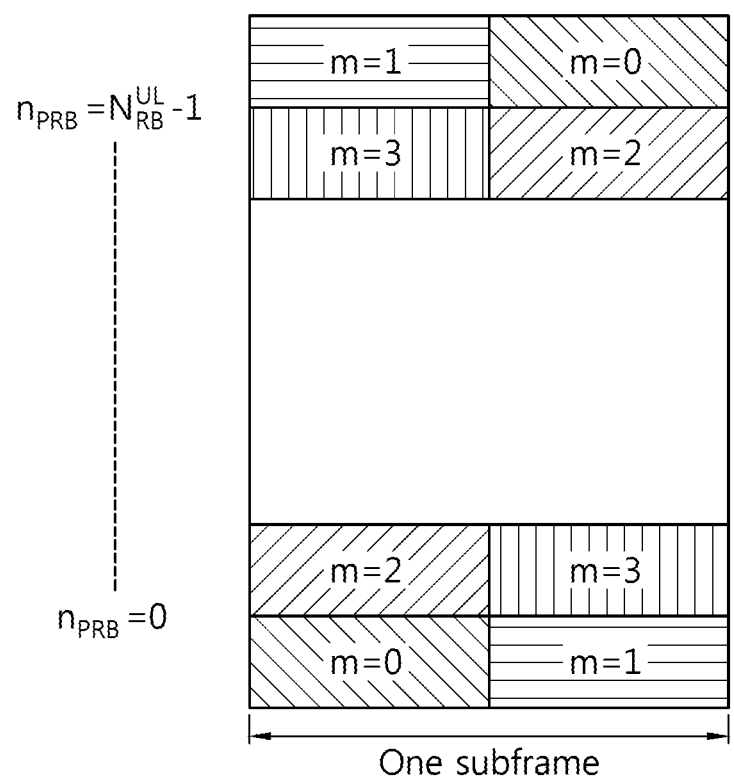
FIG. 19 illustrates an example of mapping a PUCCH to physical RBs.

FIG. 19 illustrates an example of mapping a PUCCH to physical RBs.

Referring to FIG. 19, a physical RB index $n_{\Pi PB}$ is determined based on a resource index $n^{(1)}_{\Pi YXXH,\iota}$, and a PUCCH corresponding to each m may execute frequency hopping based on a slot unit.

A PUCCH format that transmits a HARQ ACK/NACK signal may include PUCCH format 1a/1b that use channel selection and PUCCH format 3. The PUCCH format 1a/1b with channel selection may transmit a HARQ ACK/NACK signal of 2 to 4 bits. PUCCH format 3 may transmit a HARQ ACK/NACK signal of up to 20 bits for TDD, and a HARQ ACK/NACK signal of up to 10 bits for FDD.

Referring again to FIG. 18, as another example, the terminal may transmit a HARQ ACK/NACK to a base station through a PUSCH, using an RM code input bit corresponding to a HARQ-ACK(j). In this instance, when the HARQ ACK/NACK is transmitted through the PUSCH, PUCCH format 1/1a/1b with channel selection or PUCCH format 3 may need to be configured for the terminal, and PUSCH transmission needs to be scheduled on a corresponding UL subframe. When M=4 or 5, $o_\phi^{ACK}=o(j)$ is determined with reference to the channel selection table of Table 6 corresponding to M=4. For example, when HARQ-ACK(j)={ACK, ACK, ACK, NACK/DTX} in the PCell and HARQ-ACK(j)={ACK, ACK, ACK, NACK/DTX} in the SCell, a combination of the HARQ-ACK(j)s may be mapped to RM code input bit o(j)={1,1,1,1}.

Figure 20:
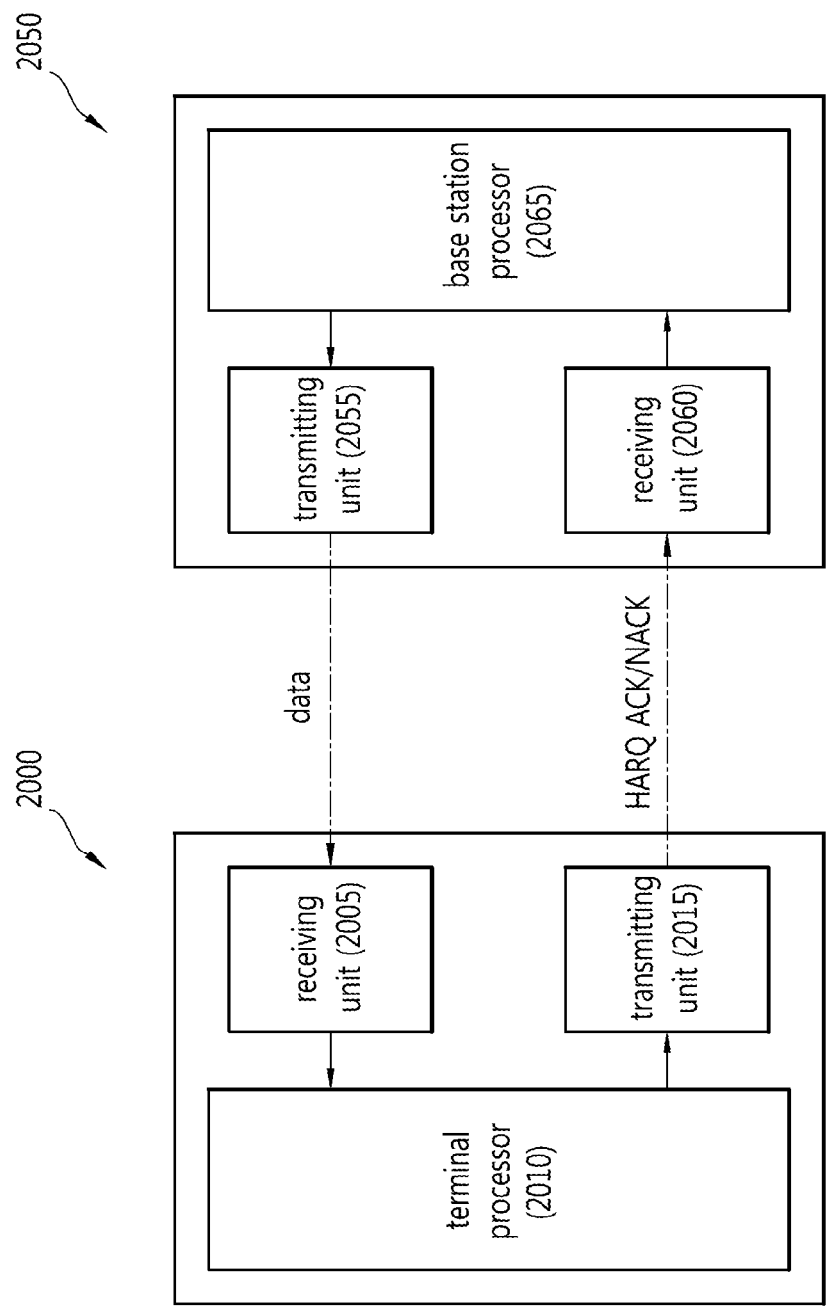
FIG. 20 is a block diagram illustrating a terminal and a base station according to an exemplary embodiment of the present invention.

FIG. 20 is a block diagram illustrating a terminal and a base station according to an embodiment of the present invention.

Referring to FIG. 20, a terminal 2000 includes a receiving unit 2005, a terminal processor 2010, and a transmitting unit 2015. The receiving unit 2005 receives data transmitted from a base station 2050 over a PCell or an SCell. Here, the data is referred to as a TB or a codeword. The data is received through a PDSCH. Together with the data, a PDCCH or an EPDCCH indicating the data may be transmitted. Here, a DCI including a DAI may be mapped to the PDCCH. A DAI value associated with a new associated subframe, as disclosed in the present specification, may or may not be identical to a DAI value of at least one legacy associated subframe. The PCell may operate based on a TDD mode, and the SCell may operate based on an FDD mode.

The receiving unit 2005 may receive the data over a plurality of subframes. The plurality of subframes may include a plurality of legacy associated subframes and at least one new associated subframe. For example, the receiving unit 2005 receives a first TB in a first subframe of the SCell, receives a second TB in a second subframe of the SCell, and receives a third TB in a third subframe of the SCell. However, the plurality of subframes may not need to be consecutive subframes.

The terminal processor 2010 generates a HARQ-ACK(j) with respect to the received data. The terminal processor 2010 may execute a MAC layer procedure associated with HARQ. The terminal processor 2010 may separately generate a HARQ-ACK(j) for each of the PCell and the SCell, and for each DAI.

In a case in which the UL-DL configuration of the PCell corresponds to UL-DL configuration 1, 2, 3, 4, 5, or 6, and $0 \leq j \leq M-1$, when a PDCCH and/or EPDCCH of an associated subframe and PDSCH transmission exist in the PCell, and a DAI value in the PDCCH and/or EPDCCH is j+1, the terminal processor 2010 generates a HARQ-ACK(j) indicating ACK, NACK, or DTX with respect to data in each associated subframe. In a case in which $0 \leq j \leq M-1$ and the UL-DL configuration of the PCell corresponds to UL-DL configuration 0, when a PDCCH and/or EPDCCH of an associated subframe and PDSCH transmission exist, the terminal processor 2010 sets a HARQ-ACK(0) as ACK, NACK, or DTX with respect to corresponding data, and for the rest, the terminal processor 2010 sets a HARQ-ACK(j) as DTX.

In a case of $0 \leq j \leq M-1$, when a PDCCH and/or EPDCCH of an associated subframe and PDSCH transmission exist in the SCell, and a DAI value in the PDCCH and/or EPDCCH is j+1, the terminal processor 2010 generates a HARQ-ACK (j) indicating ACK, NACK, or DTX with respect to data in each associated subframe.

The terminal processor 2010 generates HARQ-ACK(0), HARQ-ACK(1), . . . which are indexed by a DAI value, with respect to data received through associated subframes of the PCell, and generates HARQ-ACK(0), HARQ-ACK(1), . . . which are indexed by a DAI value, with respect to data received through associated subframes of the SCell. For example, a combination of four HARQ-ACK(j)s may exist in the PCell, and a combination of four HARQ-ACK(j)s may be generated in the SCell.

Here, the terminal processor 2010 may execute HARQ ACK/NACK bundling based on one of the all embodiments disclosed in the present specification. That is, when M=5 and DAI=5 on the SCell, an HARQ-ACK(j) indexed by a DAI associated with a new associated subframe may be bundled with a HARQ-ACK(j') of at least one legacy associated subframe. For example, a HARQ-ACK(3) corresponds to a DAI value of 4, which is a result of bundling between a HARQ ACK/NACK with respect to a PDSCH of a legacy associated subframe having a DAI=4 and a HARQ ACK/NACK with respect to a PDSCH of a new associated subframe having a DAI=5.

The transmitting unit 2015 transmits a HARQ ACK/NACK generated by the terminal processor 2010 to the base station 2050 using a predetermined UL subframe and predetermined resource. The transmitting unit 2015 may transmit the HARQ ACK/NACK through PUCCH format 1b with channel selection, or on a PUSCH.

When the transmitting unit 2015 transmits the HARQ ACK/NACK using PUCCH format 1b with channel selection, the channel selection table of Table 6 may be used.

The base station 2050 includes a transmitting unit 2055, a receiving unit 2060, and a base station processor 2065.

The transmitting unit 2055 transmits data to the terminal 2000 over a PCell or an SCell. Here, the data is referred to as a TB or a codeword. The data is received through a PDSCH. Together with the data, a PDCCH or an EPDCCH indicating the data may be received. Here, a DCI including a DAI may be mapped to the PDCCH, and the DCI may be generated by the base station processor 2065. A DAI value associated with a new associated subframe, as disclosed in the present specification, may or may not be identical to a DAI value of at least one legacy associated subframe.

The base station processor 2065 calculates a DAI value having a value accumulated according to the number of PDCCHs and/or EPDCCHs indicating PDSCH transmission. In this instance, there is no exception for a DAI of a new associated subframe. For UL-DL configurations 1 through 6, the base station processor 2065 updates a DAI value in a DCI format for each subframe (from subframe to subframe). The terminal 2000 according to the present specification may support a case in which all of the ten subframes of the SCell are associated with a single UL subframe (that is, a new DL HARQ timing), the base station processor 2065 may configure a DAI value to indicate a cumulative number of transmitted PDSCHs, that is, up to ten subframes having a PDSCH.

The receiving unit 2060 receives a HARQ ACK/NACK that is transmitted through a predetermined UL subframe and resource. The receiving unit 2060 may receive the HARQ ACK/NACK through PUCCH format 1b with channel selection, or on a PUSCH. In this instance, when the HARQ ACK/NACK is transmitted through the PUSCH, PUCCH format 1/1a/1b with channel selection or PUCCH format 3 may need to be configured for the terminal, and PUSCH transmission needs to be scheduled on a corresponding UL subframe.

When the receiving unit 2060 receives the HARQ ACK/NACK using PUCCH format 1b with channel selection, the channel selection table of Table 6 may be used.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

What is claimed is:

1. A method of communicating control information between a base station and a user equipment (UE), the method comprising:
  establishing a Radio Resource Control (RRC) connection with the base station through a first serving cell, the first serving cell supporting a Time Division Duplex (TDD) mode;
  receiving an RRC message from the base station through the first serving cell, the RRC message comprising carrier aggregation (CA) configuration information, the CA configuration information comprising information of a second serving cell supporting a Frequency Division Duplex (FDD) mode, and the first serving cell and the second serving cell being aggregated by a TDD-FDD CA scheme;
  checking a 2-bit downlink (DL) downlink assignment index (DAI) field configured in a DL downlink control information (DCI) format, the DL DCI format indicating a Physical Downlink Shared Channel (PDSCH) transmission on the second serving cell, and the 2-bit DL DAI field indicating that ten downlink subframes for the second serving cell are associated with a uplink subframe of the first serving cell;

receiving, at the UE, at least one of a Physical Downlink Control Channel (PDCCH) and an Enhanced PDCCH (EPDCCH), the at least one of the PDCCH and the EPDCCH comprising the DL DCI format;

receiving, at the UE, data through the first serving cell and the second serving cell;

in response to the received data, generating a Hybrid Automatic Repeat reQuest (HARQ) Acknowledgement/Negative Acknowledgement (ACK/NACK) signal, the HARQ ACK/NACK signal being indexed based on a value of the 2-bit DL DAI field; and transmitting the HARQ ACK/NACK signal through the uplink subframe of the first serving cell.

2. The method of claim 1, further comprising:

checking a 2-bit uplink (UL) DAI field configured in a UL DCI format, the UL DCI format indicating a Physical Uplink Shared Channel (PUSCH) transmission on the second serving cell.

3. The method of claim 1, wherein, if the value of the 2-bit DL DAI field corresponds to 2, the value of the 2-bit DL DAI field indicates that at least one of the number of subframes with the PDSCH transmission and the number of subframes with the PDCCH or the EPDCCH indicating DL Semi-Persistent Scheduling (SPS) release is 2, 6, or 10.

4. The method of claim 1, further comprising:

checking that a value of a most significant bit (MSB) of the 2-bit DL DAI field is zero(0) and a value of a least significant bit (LSB) of the 2-bit DL DAI field is one (1).

5. The method of claim 1, wherein the 2-bit DL DAI field is defined in the following Table:

| DAI MSB, LSB | $V^{UL}_{DAI}$ or $V^{DL}_{DAI}$ | Number of subframes having PDSCH and number of subframes having PDCCH/EPDCCH indicating DL Semi-Persistent Scheduling (SPS) release |
| --- | --- | --- |
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 | wherein the MSB is a most significant bit, the LSB is a least significant bit, $V^{UL}_{DAI}$ denotes a value of a UL DAI field, and $V^{DL}_{DAI}$ denotes the value of the DL DAI field.

6. The method of claim 1, wherein generating of the HARQ ACK/NACK signal comprising:

generating first HARQ ACK/NACKs indexed based on the value of the 2-bit DL DAI field, the first HARQ ACK/NACKs being responsive to the data received through subframes of the first serving cell;

generating second HARQ ACK/NACKs indexed based on the value of the 2-bit DL DAI field, the second HARQ ACK/NACKs being responsive to the data received through subframes of the second serving cell; and generating the HARQ ACK/NACK signal comprising the first HARQ ACK/NACKs and the second HARQ ACK/NACKs.

7. The method of claim 6, wherein the first HARQ ACK/NACKs and the second HARQ ACK/NACKs are combined based on a Physical Uplink Control Channel (PUCCH) resource index and a constellation of a modulation symbol, and wherein the first HARQ ACK/NACKs and the second HARQ ACK/NACKs are transmitted through a PUCCH format 1/1a/1b with a channel selection, a PUCCH format 3, or a Physical Uplink Shared Channel (PUSCH).

8. A method of communicating control information between a base station and a user equipment (UE), the method comprising:

establishing a Radio Resource Control (RRC) connection with the UE through a first serving cell, the first serving cell supporting a Time Division Duplex (TDD) mode;

transmitting an RRC message to the UE through the first serving cell, the RRC message comprising carrier aggregation (CA) configuration information, the CA configuration information comprising information of a second serving cell supporting a Frequency Division Duplex (FDD) mode, and the first serving cell and the second serving cell being aggregated by a TDD-FDD CA scheme;

configuring a 2-bit downlink (DL) downlink assignment index (DAI) field in a DL downlink control information (DCI) format, the DL DCI format indicating a Physical Downlink Shared Channel (PDSCH) transmission on the second serving cell, and the 2-bit DL DAI field indicating that ten downlink subframes for the second serving cell are associated with a uplink subframe of the first serving cell;

transmitting, to the UE, at least one of a Physical Downlink Control Channel (PDCCH) and an Enhanced PDCCH (EPDCCH), the at least one of the PDCCH and the EPDCCH comprising the DL DCI format;

transmitting, to the UE, data through the first serving cell and the second serving cell; and in response to the transmitted data, receiving a Hybrid Automatic Repeat reQuest (HARQ) Acknowledgement/Negative Acknowledgement (ACK/NACK) signal, the HARQ ACK/NACK signal being indexed based on a value of the 2-bit DL DAI field, wherein the HARQ ACK/NACK signal is received through the uplink subframe of the first serving cell.

9. The method of claim 8, further comprising:

configuring a 2-bit uplink (UL) DAI field in a UL DCI format, the UL DCI format indicating a Physical Uplink Shared Channel (PUSCH) transmission on the second serving cell.

10. The method of claim 8, wherein, if the value of the 2-bit DL DAI field corresponds to 2, the value of the 2-bit DL DAI field indicates that at least one of the number of subframes with the PDSCH transmission and the number of subframes with the PDCCH or the EPDCCH indicating DL Semi-Persistent Scheduling (SPS) release is 2, 6, or 10.

11. The method of claim 8, further comprising:

configuring a most significant bit (MSB) of the 2-bit DL DAI field as zero (0) and a least significant bit (LSB) of the 2-bit DL DAI field as one (1).

12. The method of claim 8, wherein the 2-bit DL DAI field is defined in the following Table:

| DAI MSB, LSB | $V^{UL}_{DAI}$ or $V^{DL}_{DAI}$ | Number of subframes having PDSCH and number of subframes having PDCCH/EPDCCH indicating DL Semi-Persistent Scheduling (SPS) release |
| --- | --- | --- |
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 | wherein the MSB is a most significant bit, the LSB is a least significant bit, $V^{UL}_{DAI}$ denotes a value of a UL DAI field, and $V^{DL}_{DAI}$ denotes the value of the DL DAI field.

13. The method of claim 8, wherein the HARQ ACK/NACK signal comprising:

first HARQ ACK/NACKs indexed based on the value of the 2-bit DL DAI field, the first HARQ ACK/NACKs being responsive to the data transmitted through subframes of the first serving cell; and second HARQ ACK/NACKs indexed based on the value of the 2-bit DL DAI field, the second HARQ ACK/NACKs being responsive to the data transmitted through subframes of the second serving cell.

14. The method of claim 13, wherein the first HARQ ACK/NACKs and the second HARQ ACK/NACKs are combined based on a Physical Uplink Control Channel (PUCCH) resource index and a constellation of a modulation symbol, and wherein the first HARQ ACK/NACKs and the second HARQ ACK/NACKs are transmitted through a PUCCH format 1/1a/1b with a channel selection, a PUCCH format 3, or a Physical Uplink Shared Channel (PUSCH).

* * * * *